(12) United States Patent
Shoji et al.

(10) Patent No.: US 7,424,776 B2
(45) Date of Patent: Sep. 16, 2008

(54) METHOD FOR MACHINING A WORKPIECE

(75) Inventors: Masahiro Shoji, Ishikawa (JP); Masumi Shimomura, Ishikawa (JP)

(73) Assignee: Komatsu Machinery Corporation, Ishikawa (JP)

( * ) Notice: Subject to any disclaimer, the term of this patent is extended or adjusted under 35 U.S.C. 154(b) by 0 days.

(21) Appl. No.: 11/717,564

(22) Filed: Mar. 13, 2007

(65) Prior Publication Data

US 2007/0231096 A1      Oct. 4, 2007

(30) Foreign Application Priority Data

Mar. 15, 2006      (JP)      ............................. 2006-071229

(51) Int. Cl.
*B23P 15/00*      (2006.01)
*B23B 5/22*      (2006.01)
*B23C 3/06*      (2006.01)

(52) U.S. Cl. ...................... 29/888.08; 29/558; 29/27 C; 82/1.11; 82/106; 409/132; 409/199; 451/399; 279/4.12; 279/17; 279/106; 279/133

(58) Field of Classification Search ................. 29/27 C, 29/27 R, 6.01, 557–558, 888.08, 888.1; 82/106, 82/1.11; 409/131–132, 199–200, 244; 279/4.12, 279/4.1, 16–17, 35, 66, 106–107, 109–110, 279/133; 451/181, 399

See application file for complete search history.

(56) References Cited

U.S. PATENT DOCUMENTS

| | | | | |
|---|---|---|---|---|
| 3,751,053 A | * | 8/1973 | Swanson | .................... 279/119 |
| 3,767,219 A | * | 10/1973 | Fischer et al. | ................ 279/106 |
| 4,677,885 A | * | 7/1987 | Schmid et al. | ................. 82/165 |
| 5,025,689 A | * | 6/1991 | Mayer | .......................... 82/106 |
| 5,184,833 A | * | 2/1993 | Cross et al. | ................... 279/106 |
| 5,230,265 A | * | 7/1993 | Schmid | ........................ 82/106 |
| 5,752,706 A | * | 5/1998 | Hodges | ........................ 279/16 |
| 6,161,991 A | * | 12/2000 | Kumazawa et al. | .......... 409/132 |
| 6,454,278 B1 | * | 9/2002 | Wrobel et al. | ............... 279/130 |
| 2001/0011800 A1 | * | 8/2001 | Hanai | .......................... 279/132 |

FOREIGN PATENT DOCUMENTS

JP      2005-095996 A      *      4/2005

OTHER PUBLICATIONS

Machine Translation of JP 2005-095996-A, 10 pages.*

* cited by examiner

*Primary Examiner*—Erica E Cadugan
(74) *Attorney, Agent, or Firm*—Welsh & Katz, Ltd.

(57) ABSTRACT

A method for machining a workpiece in which a machine tool comprising a first and a second chuck devices is employed to machine the workpiece, the machine tool being used in which the first and the second chuck devices comprise a chuck main body, plural chuck jaws, a chuck jaw drive body, and a pressing member, the method comprising: machining a clamp part of the other end part of the workpiece in a state where one end part of the workpiece is clamped by the first chuck device; machining a clamp part of the one end part of the workpiece in a state where the clamp part of the other end part of the workpiece is clamped by the second chuck device; and executing desired machining on the workpiece in a state where each of the clamp parts are clamped by each of the chuck devices.

1 Claim, 21 Drawing Sheets

CONCEPTUAL VIEW SHOWING AN EXAMPLE OF A MACHINE TOOL FOR IMPLEMENTING A METHOD FOR MACHINING WORKPIECE PERTAINING TO THE PRESENT INVENTION

CONCEPTUAL VIEW SHOWING AN EXAMPLE OF A MACHINE TOOL FOR IMPLEMENTING A METHOD FOR MACHINING WORKPIECE PERTAINING TO THE PRESENT INVENTION

EXTERNAL APPEARANCE PERSPECTIVE VIEW OF A CHUCK DEVICE OF THE MACHINE TOOL SHOWN IN FIG. 2

FULL FRONT VIEW OF THE CHUCK
DEVICE SHOWN IN FIG. 3

CROSS-SECTIONAL FULL SIDE VIEW OF THE CHUCK DEVICE SHOWN IN FIG. 3

MAIN PART CROSS-SECTIONAL BOTTOM VIEW OF THE CHUCK DEVICE SHOWN IN FIG.3

CROSS-SECTIONAL VIEW TAKEN ALONG
THE LINE VII-VII OF FIG. 5

MAIN PART CROSS-SECTIONAL SIDE VIEW SHOWING
THE PERIPHERY OF A PRESSING MEMBER OF
THE CHUCK DEVICE SHOWN IN FIG. 3

MAIN PART CROSS-SECTIONAL SIDE VIEW SHOWING
THE PERIPHERY OF A PRESSING MEMBER OF
THE CHUCK DEVICE SHOWN IN FIG. 3

CONCEPTUAL CROSS-SECTIONAL VIEW SHOWING
A SPHERICAL BEARING OF A CENTERING MECHANISM
OF CHUCK DEVICE SHOWING IN FIG. 3

MAIN PART CROSS-SECTIONAL SIDE VIEW OF THE CHUCK DEVICE

MAIN PART CROSS-SECTIONAL SIDE VIEW OF THE CHUCK DEVICE

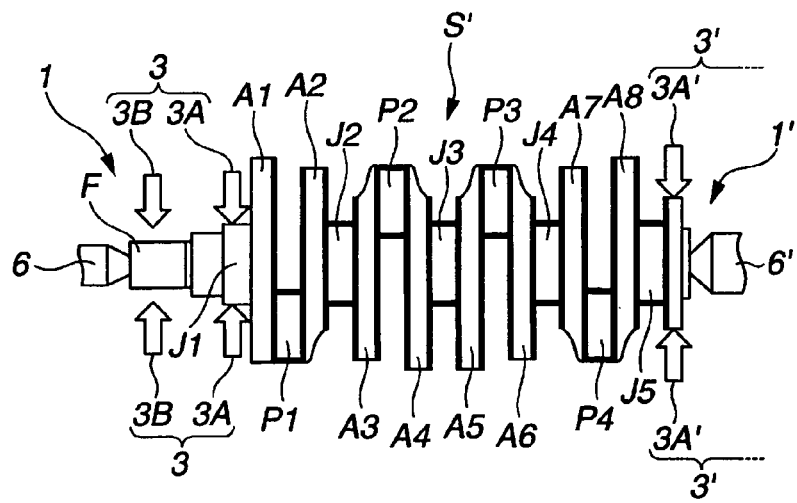
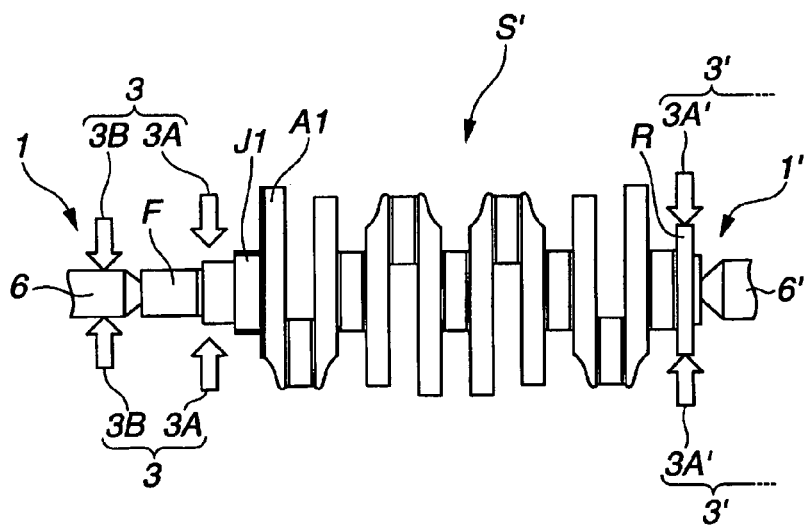
CONCEPTUAL VIEWS SHOWING A CRANKSHAFT
MACHINED MODE PRODUCED BY THE MACHINE TOOL
- SHOWN IN FIG. 2 -

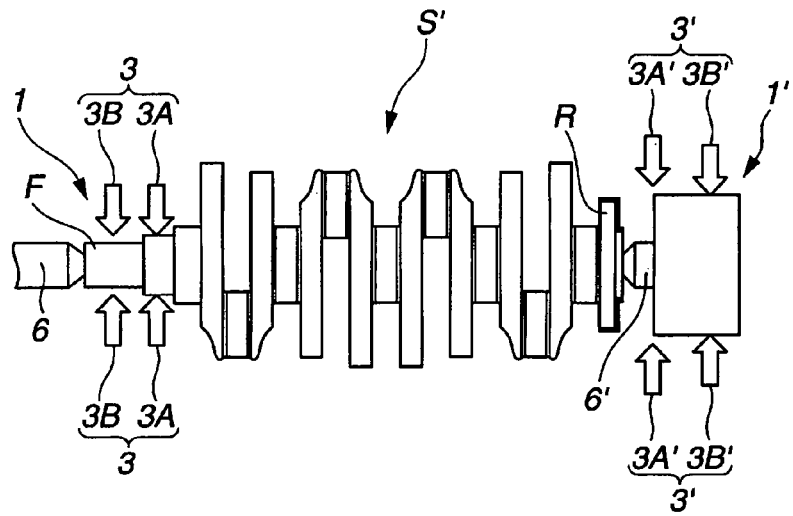
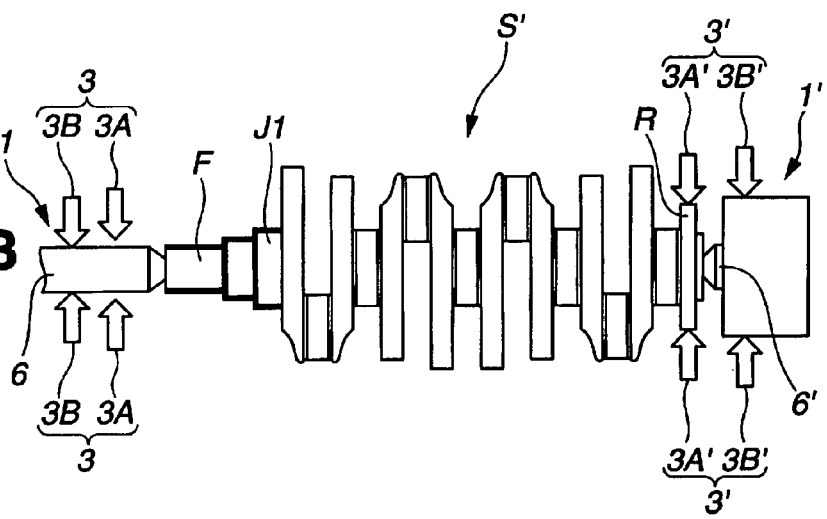
CONCEPTUAL VIEWS SHOWING A CRANKSHAFT
MACHINED MODE PRODUCED BY THE MACHINE TOOL
SHOWN IN FIG. 2

CONCEPTUAL VIEW SHOWING A CRANKSHAFT
MACHINED MODE PRODUCED BY THE MACHINE TOOL
SHOWN IN FIG. 2

CONCEPTUAL VIEW SHOWING A WORKPIECE REGRIPPING MODE OF THE MACHINE TOOL SHOWN IN FIG. 2

CONCEPTUAL VIEW SHOWING A WORKPIECE REGRIPPING MODE OF THE MACHINE TOOL SHOWN IN FIG. 2

CONCEPTUAL VIEW SHOWING A WORKPIECE REGRIPPING MODE OF THE MACHINE TOOL SHOWN IN FIG. 2

CONCEPTUAL VIEW SHOWING A WORKPIECE REGRIPPING MODE OF THE MACHINE TOOL SHOWN IN FIG. 2

EXTERNAL APPEARANCE FULL SIDE VIEW SHOWING AN EXAMPLE OF THE CRANKSHAFT

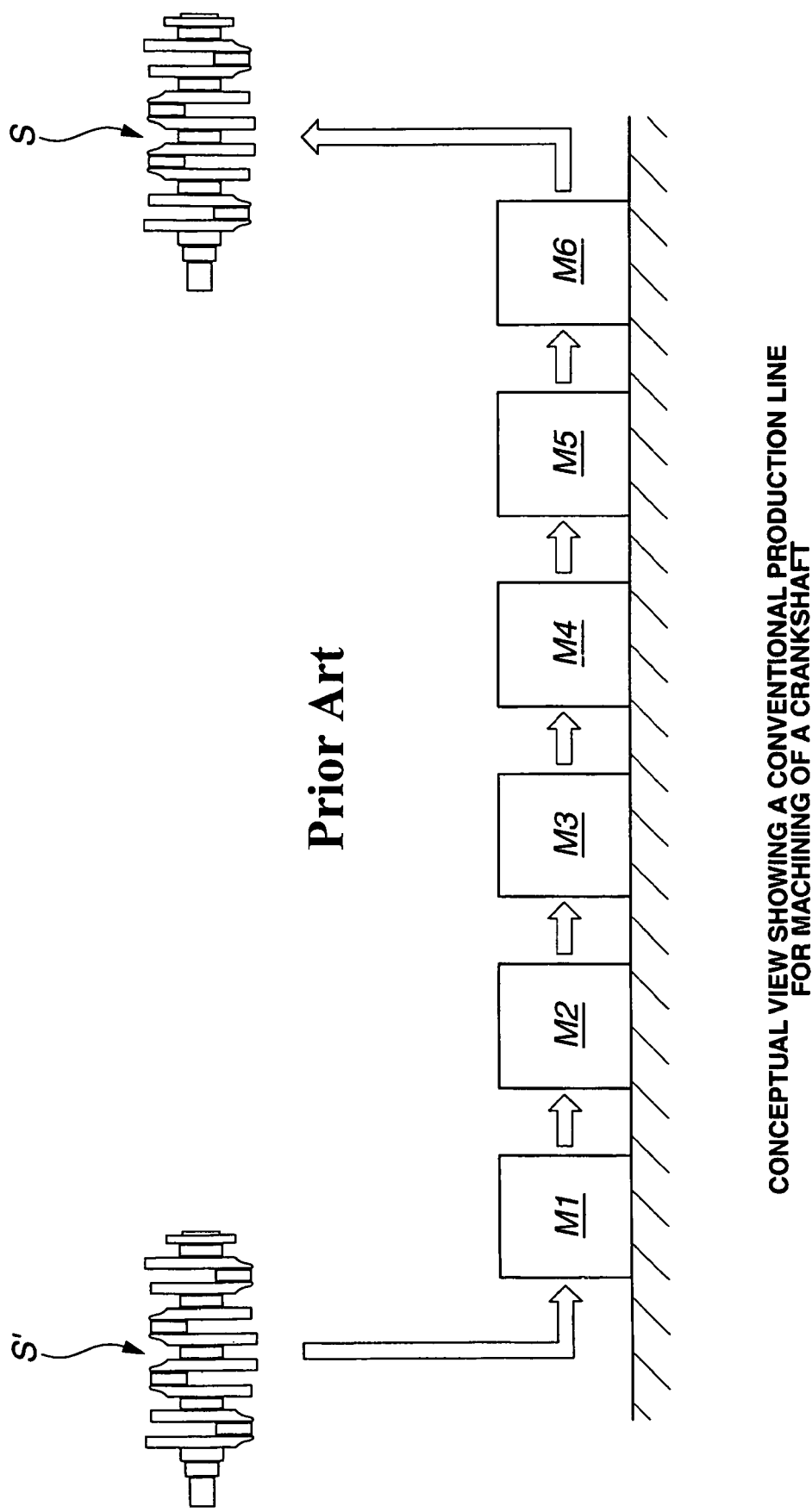

METHOD FOR MACHINING A WORKPIECE

BACKGROUND OF THE INVENTION

1. Field of the Invention

The present invention relates to a method for machining a workpiece employing a machine tool comprising a first chuck device for clamping one end part of a workpiece and a second chuck device for clamping the other end part of the workpiece, and more particularly to a method for machining a workpiece suitable for application in a crankshaft production line.

2. Description of the Related Art

Solid-type crankshafts which serve as a machine component part of an engine are normally manufactured by cutting and grinding a forged crankshaft starting material manufactured by employing machine tools, and the machining and manufacture of a crankshaft of a complex shape necessitates the implementation of a large number of machining steps employing a range of machining tools.

As is well known, a common crankshaft S as shown in FIG. 20 comprises a predetermined number of arms (crank arms) A1 to A8 to which journals (main journals) J1 to J5, pins (crank pins) P1 to P4 and balance weights are integrally coupled, a front shaft F to which a timing pulley or tensional damper or the like is affixed being formed in a front-side end part (left-end part in the drawing), and a rear flange (output-side flange) R to which a flywheel or the like is affixed being formed in a rear-side end part (right-end part in the drawing) thereof.

A production line for carrying out machining steps from a forged crankshaft starting material to a semi-finishing machining step of the pins P1 to P4 is normally configured from a total of six machining tools comprising, as shown in FIG. 21, a centering machine M1, a front-side lathe M2, a rear-side lathe M3, and a first crankshaft mirror (pin mirror) M4, a turn-turn broaching tool M5 and a second crankshaft mirror (pin mirror) M6 of a shaft machining device, the crankshaft S being manufactured to a predetermined shape as a result of a crankshaft starting material S' being successively introduced into and machined by the machine tools M1 to M6.

That is to say, first, the centering machine M1 performs a planar machining of the front-side end face and rear-side end face of the crankshaft starting material S' and forms center holes in each of the front-side end face and rear-side end face.

Next, the front-side lathe M2 performs a lathe-turning machining of the outer circumferential surface of the front shaft F and journal J1 and the external shape surface of the arm A1, after which the rear-side lathe M3 performs a lathe-turning machining of the outer circumferential surface and external shape surface of the rear flange R.

The machining steps performed by the front-side lathe M2 and rear-side lathe M3 constitute steps that involve forming of a clamp part in each of the front side and rear side of the crankshaft starting material S'.

Next, the first crankshaft mirror (pin mirror) M4 performs a rough-surface machining of the outer circumferential surface of the journals J2 to J5, the outer circumferential surface of the pins P1 to P4 and the external shape surface and inner surface of the arm A1, and performs a rough-surface machining of the external shape surface and inner surface of the arms A2 to A8.

Next, the turn-turn broaching machine M5 performs a semi-finish machining of the outer circumferential surface of the journals J2 to J5, after which the second crankshaft mirror (pin mirror) M6 performs a semi-finish machining and groove-machining of the outer circumferential surface of the pins P1 to P4.

However, the large number (six in total) of machine tools for which equipment is required of a conventional production line such as the one described above carries an inherent problem of very high installation costs associated with construction of the production line (initial establishment costs) and running costs associated with actual operation of the production line.

That is to say, there are unavoidable equipment costs associated with the six machine tools and the loaders provided between the machine tools in the construction of the production line and, furthermore, there are increased land costs as well as increased fundamental construction costs associated with the greater space required for securing the factory building area for provision of the production line.

In addition, a large number of machine tools (six in total) means a large quantity of electrical power energy is consumed in the operation of the production line and, in addition, apart from the costs necessitated by the processing of the scraps and so on discharged from each of the machining tools, there are unavoidable upkeep costs associated with maintenance and inspection of each machine tool.

SUMMARY OF THE INVENTION

With the foregoing conditions in view, it is an object of the present invention to provide a method for machining a workpiece in which the initial costs and running costs of the production line can be optimally reduced.

The invention relates to a method for machining a workpiece in which a machine tool comprising a first chuck device for clamping one end part of the workpiece and a second chuck device for clamping the other end part of the workpiece is employed to carry out a machining operation on the workpiece, the machine tool being used in which the first chuck device and the second chuck device comprise a chuck main body fixedly arranged in a tip end of a main spindle, a plurality of chuck jaws arranged to move freely along a radial direction of the chuck main body, a chuck jaw drive body, provided concentrically with a center axis of the main spindle and the chuck main body, that moves advancingly and retreatively along the center axis, and a pressing member supported rotatably and tiltably by the chuck jaw drive body through a spherical bearing provided in a center region, and which is configured to clamp the workpiece by pressing a plurality of chuck jaw rods respectively linked with the plurality of chuck jaws using the pressing member in accordance with actuation of the chuck jaw drive body and by causing the plurality of chuck jaws to move in a radially inward direction, the method comprising the steps of: machining a clamp part of the other end part of the workpiece in a state in which the one end part of the workpiece is clamped by the first chuck device and the other end part of the workpiece is released by the second chuck device; machining a clamp part of the one end part of the workpiece in a state in which the clamp part of the other end part of the workpiece is clamped by the second chuck device and the one end part of the workpiece is released by the first chuck device; and executing desired machining on the workpiece in a state in which the clamp part of the one end part of the workpiece is clamped by the first chuck device and the clamp part of the other end part of the workpiece is clamped by the second chuck device.

Because the chuck device of the machine tool employed to carry out the method for machining a workpiece pertaining to the invention comprises a chuck jaw drive body that pivotally supports a pressing member by way of a spherical bearing, a far greater centering amount, that is to say, dimensional error from a center reference in the workpiece outer circumferential surface than possible with an existing chuck device can be clamped by a plurality of chuck jaws, and the black coating surface of a workpiece manufactured by forging can be clamped.

Because the machine tool described above facilitate machining of a clamp part for which separate machine tools (lathes) are conventionally required and machining of a one end part and the other end part of a workpiece and a desired machining operation on a workpiece can be carried out using a single machine tool, the number of machine tools from which the production line is configured can be reduced and, in turn, based on the method for machining a workpiece pertaining to the aspect of the invention, the initial costs and running costs of the production line can be optimally reduced.

In the method for machining a workpiece pertaining to an aspect of the invention according to the method for machining a workpiece, the workpiece serving as the target material for machining is a crankshaft starting material for manufacturing an engine crankshaft.

In the method for machining a workpiece pertaining to the aspect of the invention because the work serving as the target for machining is a crankshaft starting material, similarly to the method for machining a workpiece pertaining to the aspect of the invention, the initial costs and running costs of the production line can be optimally reduced.

BRIEF DESCRIPTION OF THE DRAWINGS

FIG. 13A and FIG. 13B are conceptual views showing a crankshaft machined mode produced by the machine tool shown in FIG. 2;

FIG. 14A and FIG. 14B are conceptual views showing a crankshaft machined mode produced by the machine tool shown in FIG. 2;

FIG. 21 is conceptual view showing a conventional production line for machining of a crankshaft.

DESCRIPTION OF THE PREFERRED EMBODIMENTS

The present invention will be hereinafter described in detail with reference to drawings illustrating an embodiment thereof.

FIG. 1 to FIG. 19 show one example of the application of a method for machining a workpiece pertaining to the present invention in a crankshaft production line.

Figure 20:
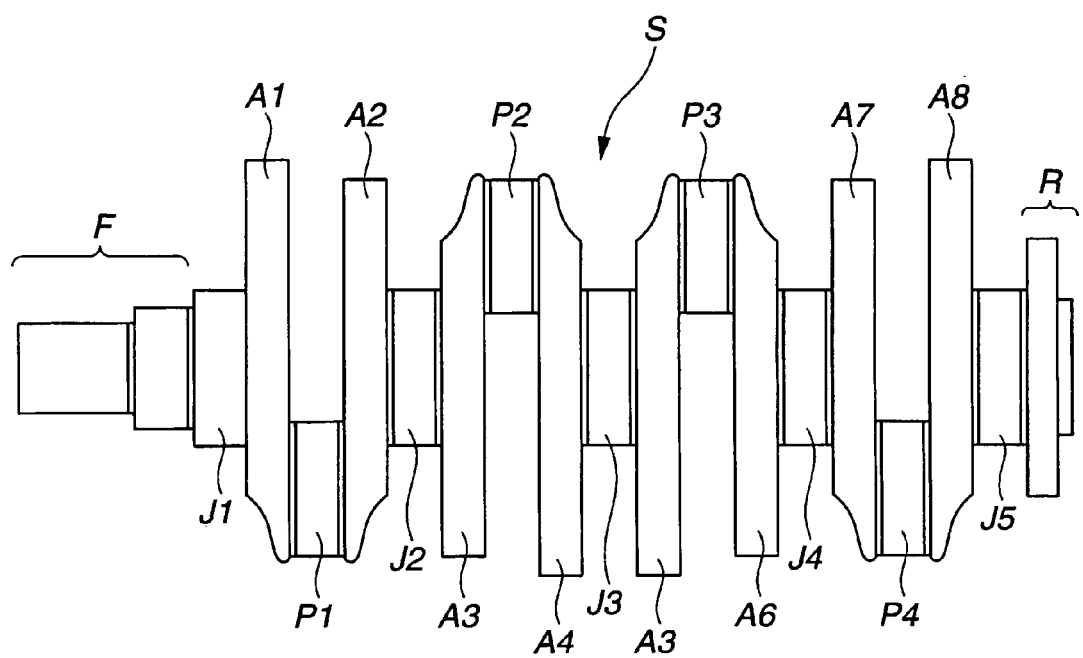
FIG. 20 is an external appearance full side view showing an example of the crankshaft.

The configuration of the crankshaft serving as the target for machining is fundamentally identical to the crankshaft S shown in FIG. 20, and the description of the crankshaft S in the explanation provided hereinafter is given with reference to FIG. 20.

In addition, the crankshaft starting material serving as the workpiece on which the machining is to be actually administered is a forged product that, with a cutting allowance in mind, is manufactured slightly larger than the crankshaft S.

Figure 1:
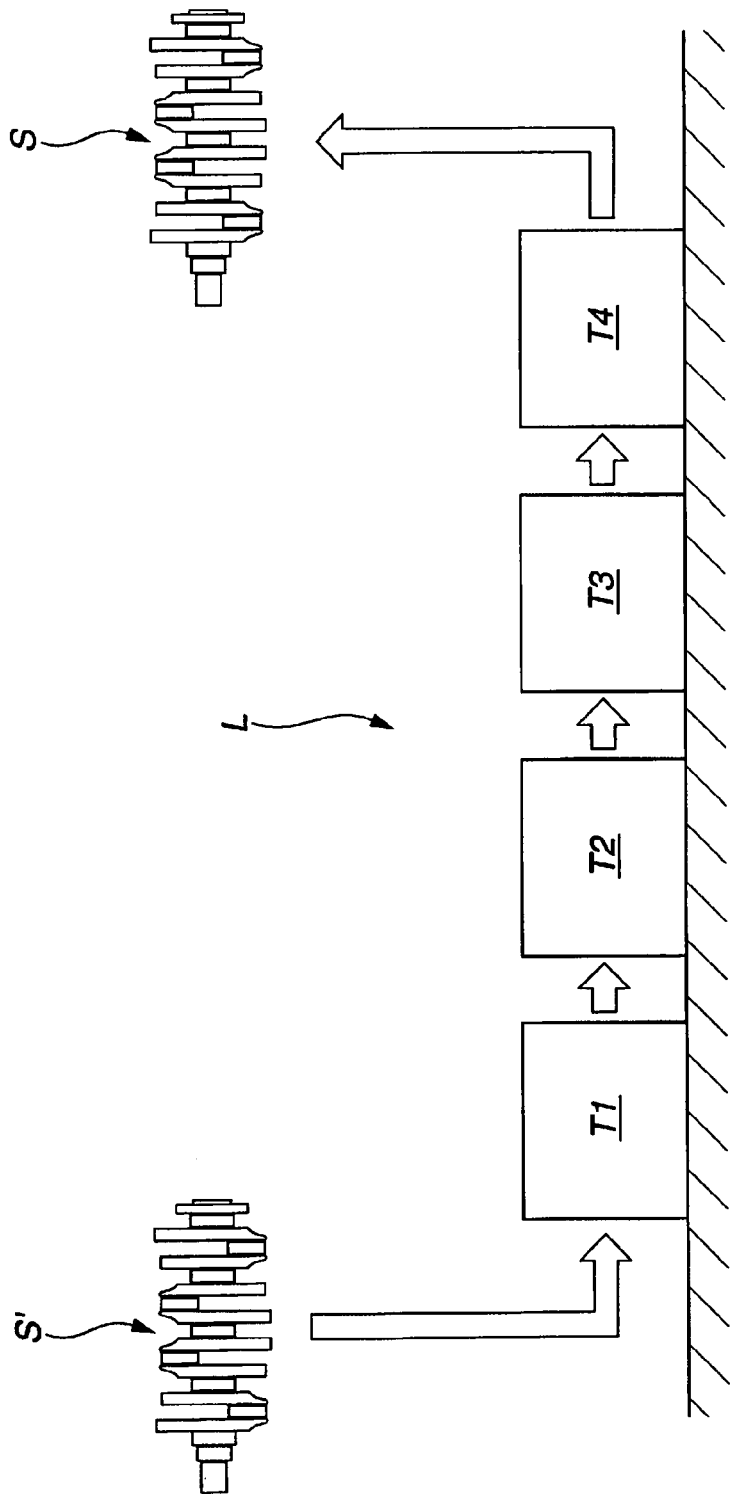
FIG. 1 is a conceptual view showing a production line of a crankshaft to which a method for machining a workpiece pertaining to the present invention is applied.

FIG. 1 depicts the machining sequence from the crankshaft starting material S' manufactured by forging to when a semi-finish machining step of pins P1 to P4 of the crankshaft S are carried out, a production line L in which the present invention has application being configured from a total of four machine tools consisting of a centering machine T1, first crankshaft mirror (pin mirror) T2, turn-turn broaching machine T3, and second crankshaft mirror (pin mirror) T4, the crankshaft S of predetermined shape being manufactured as a result of the crankshaft starting material S' being successively introduced and machined by the machine tools T1 to T4.

The centering machine T1 of this production line L is identical to the known centering machine (M1) of a conventional production line (see FIG. 21).

On the other hand, different to the known crankshaft mirrors (M4, M6) and turn-turn broaching machine (M5) of a conventional production line (see FIG. 21), the later-described chuck device of the first crankshaft mirror T2, turn-turn broaching machine T3 and second crankshaft mirror T4 of the production line L are assembled to comprise a centering function and a regripping function.

While the first crankshaft mirror T2, turn-turn broaching machine T3 and second crankshaft mirror T4 described above are different in terms of their usage tool purpose and the actuation control thereof, in terms of the configuration they employ for holding a workpiece they are fundamentally identical and, accordingly, the configuration of the first crankshaft mirror T2 alone will be described and descriptions of the turn-turn broaching machine T3 and second crankshaft mirror T4 given hereinafter will use the configuration of the first crankshaft mirror T2 as a reference. Notably, the turn-turn broaching machine T3 does not comprise a later-described phase jaw.

Figure 2:
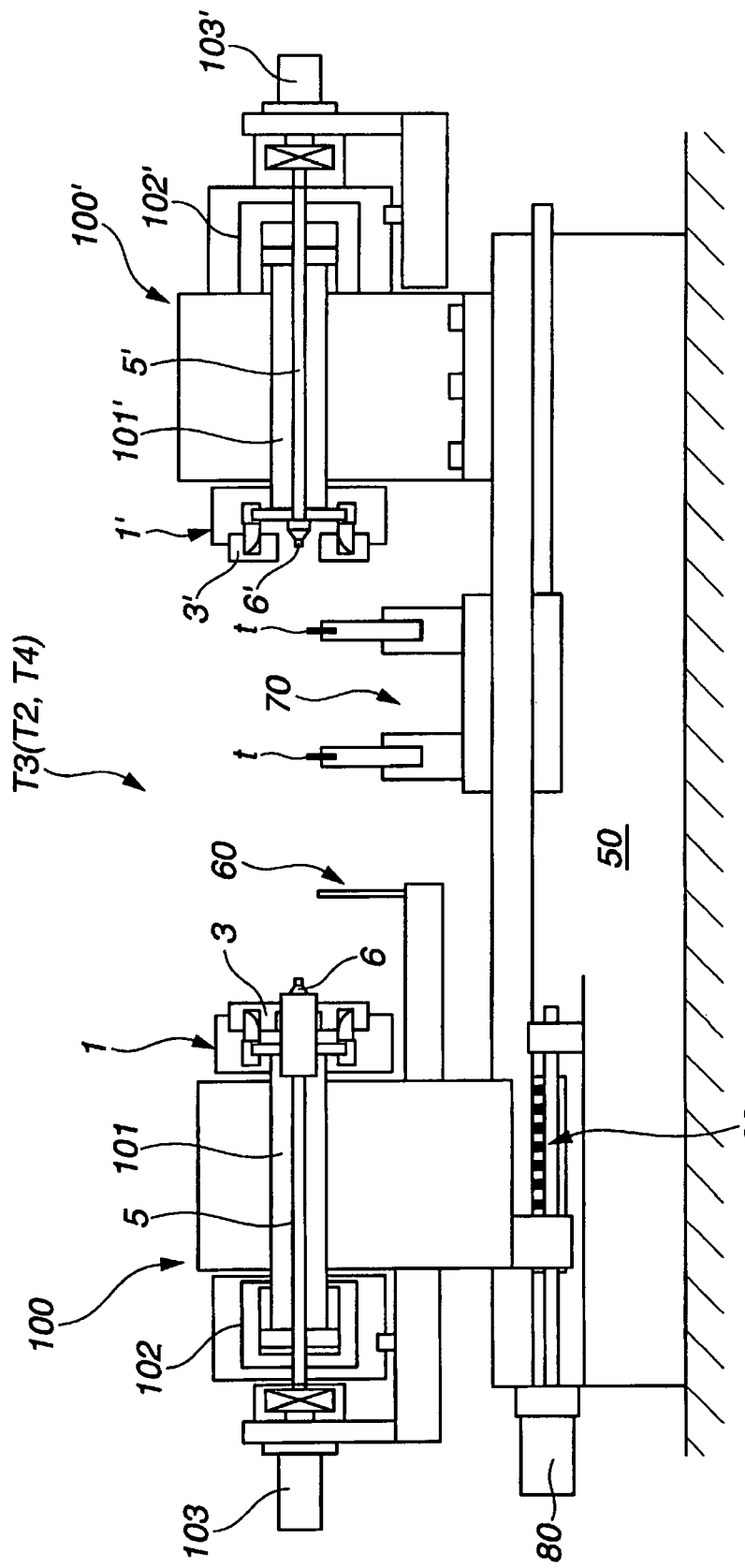
FIG. 2 is a conceptual view showing an example of a machine tool for implementing the method for machining a workpiece pertaining to the present invention.
Figure 3:
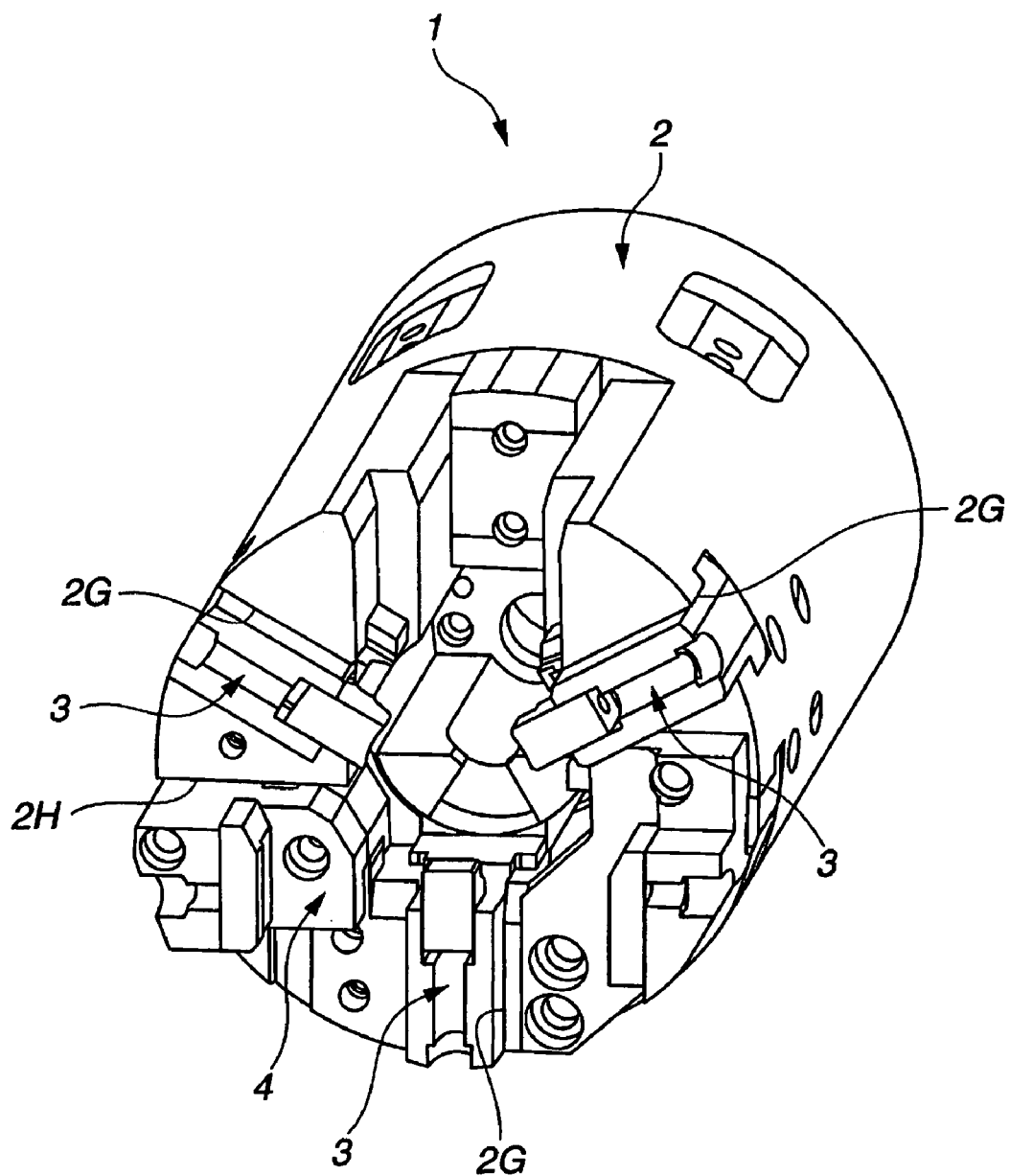
FIG. 3 is an external appearance perspective view of a chuck device of the machine tool shown in FIG. 2.
Figure 4:
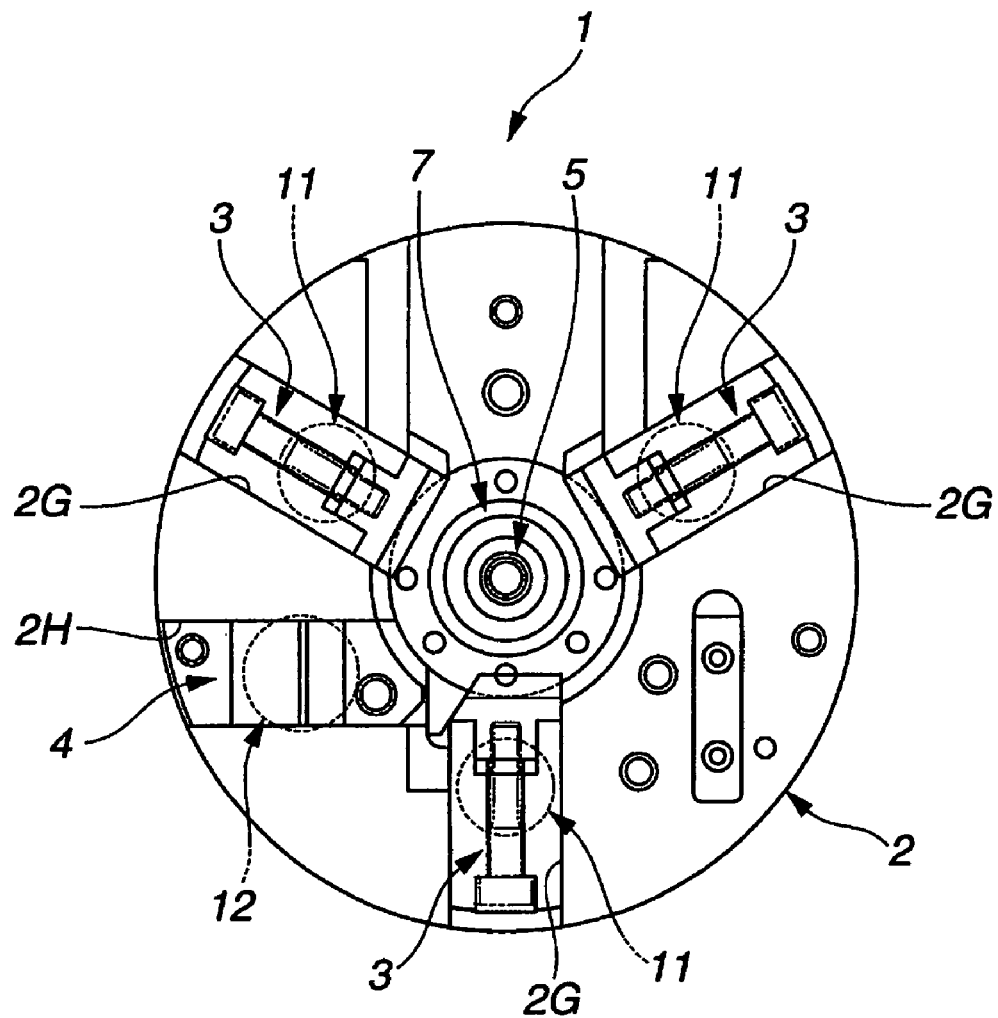
FIG. 4 is a full front view of the chuck device shown in FIG. 3.
Figure 5:
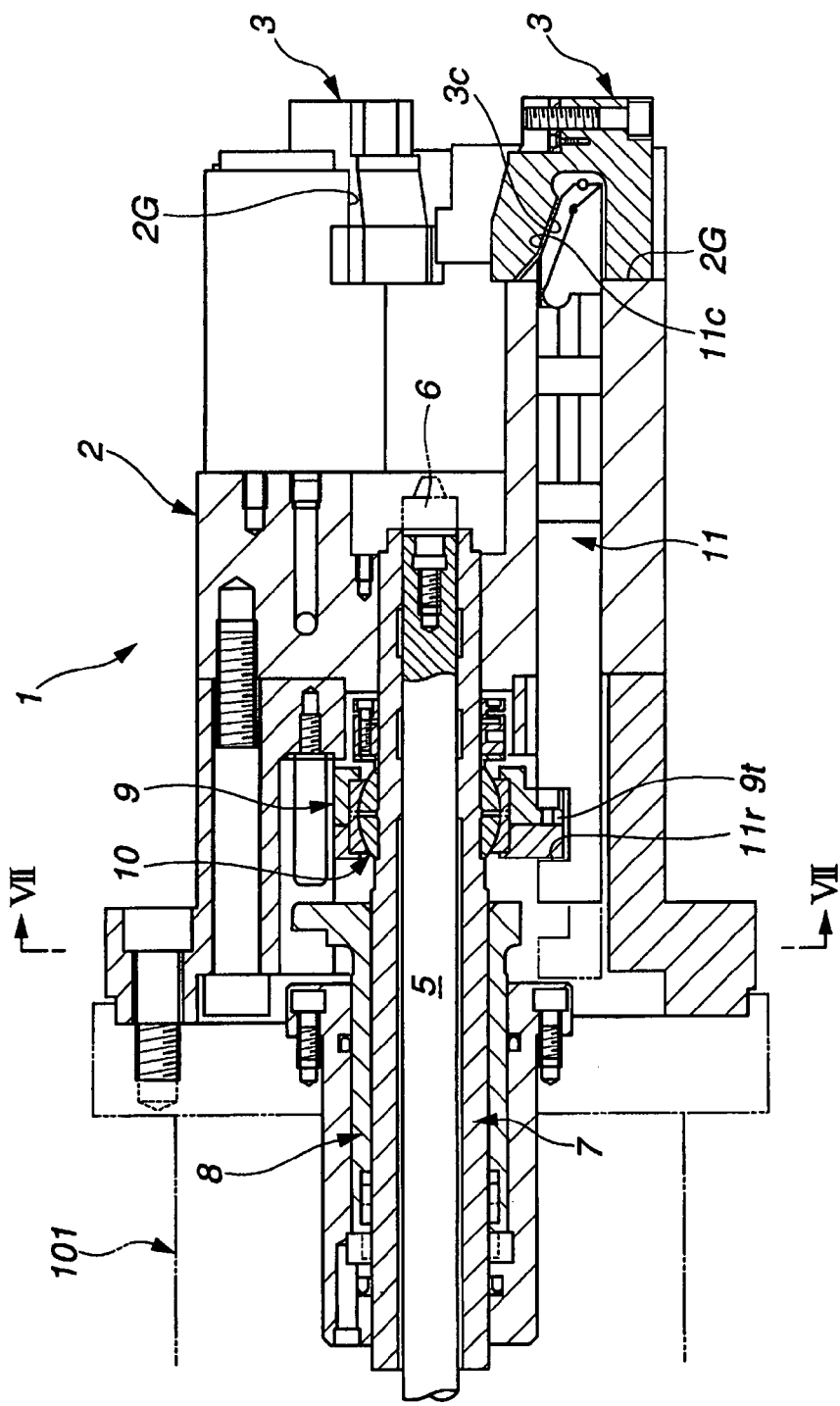
FIG. 5 is a full side cross-sectional view of the chuck device shown in FIG. 3.
Figure 6:
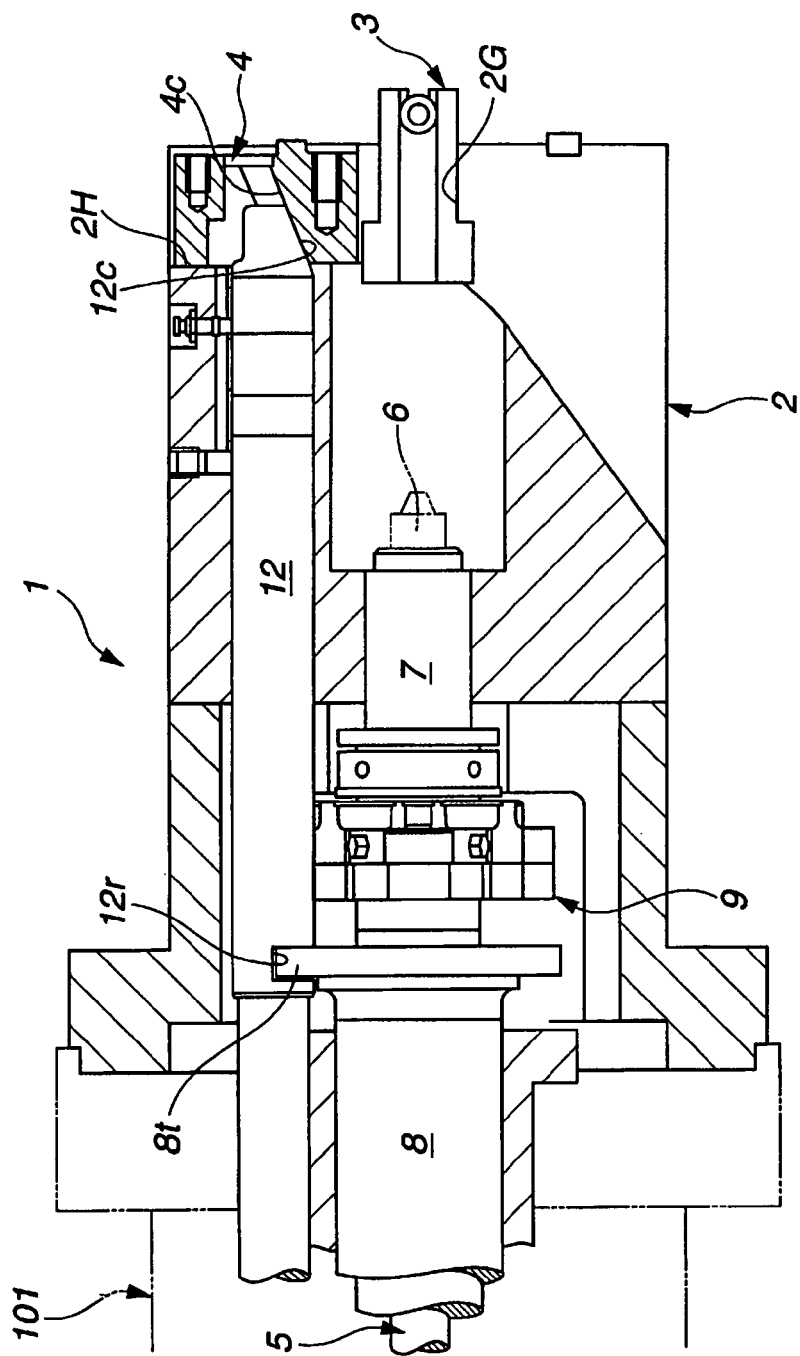
FIG. 6 is a main part cross-sectional bottom view of the chuck device shown in FIG. 3.
Figure 7:
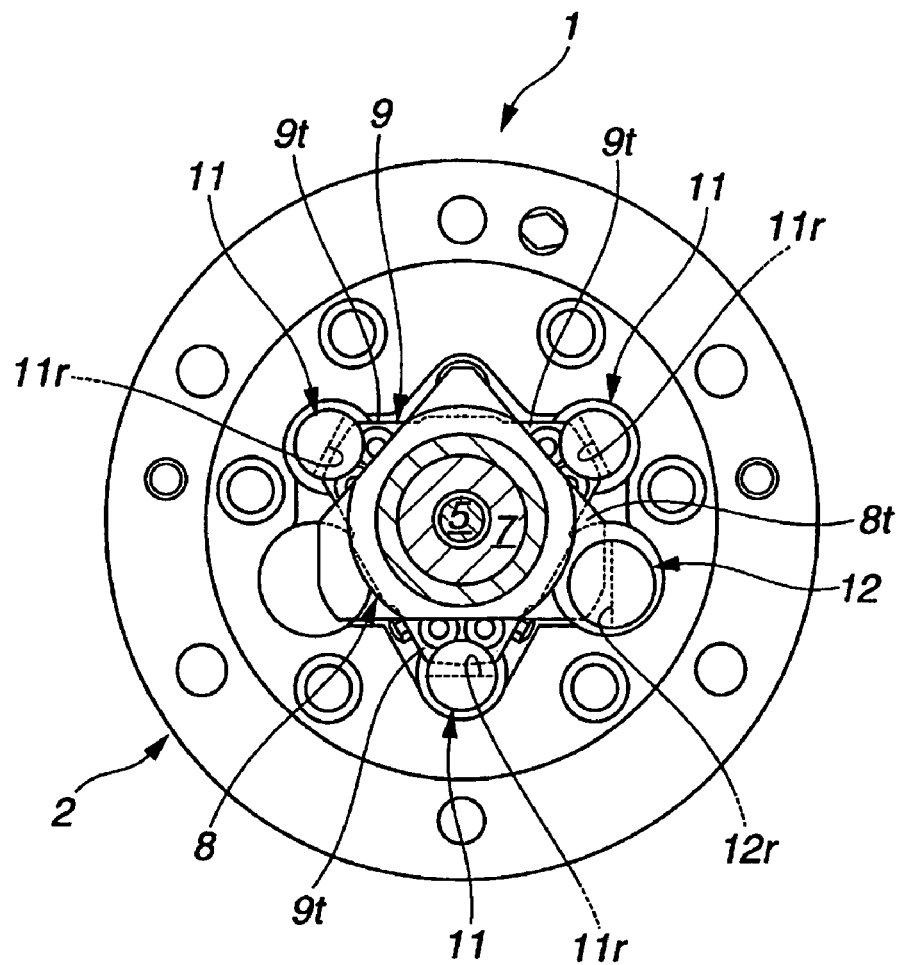
FIG. 7 is a cross-sectional view taken along the line VII-VII of FIG. 5.
Figure 8:
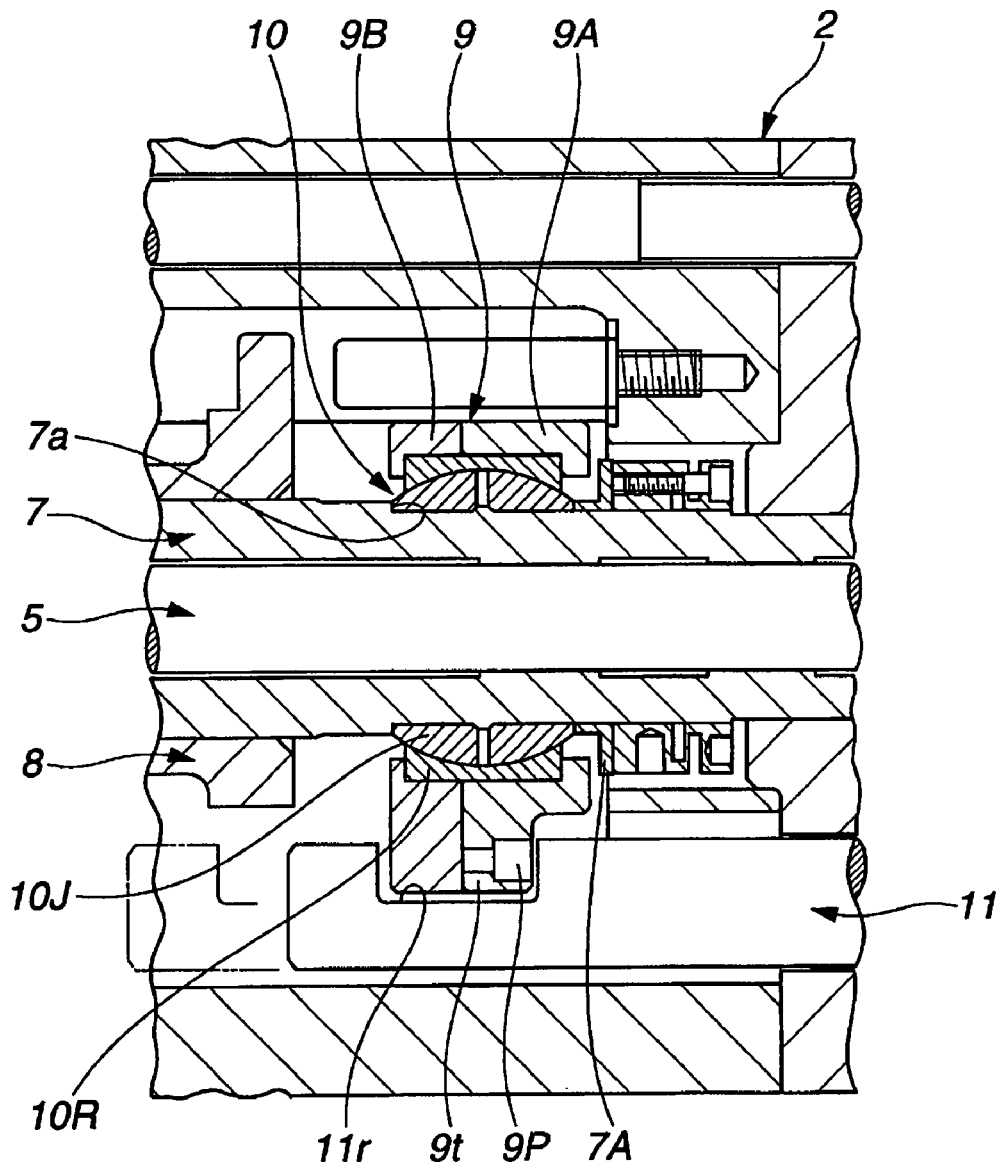
FIG. 8 is a main part cross-sectional side view showing the periphery of a pressing member of the chuck device shown in FIG. 3.

As shown in FIG. 2, a front-side workpiece head 100 and a rear-side workpiece head 100' of the first crankshaft mirror T2 are relatively opposingly disposed in an upper part of a head 50 fitted to a floor.

In addition, together with a tool head 70 on which a tool t is mounted provided to be freely actuatingly controlled, a workpiece buffer stage 60 on which the crankshaft S is loaded is vertically-movably provided between the front-side workpiece head 100 and rear-side workpiece head 100'.

The front-side workpiece head 100 is provided to move freely in a direction toward and away from the relatively opposing rear-side workpiece head 100' and is configured to be movably actuated by a workpiece head movement servo motor 80 provided in the head 50 and fixed to a predetermined position on the head 50 by workpiece head lock means 90.

In addition, a chuck device (first chuck device) 1 is mounted on a main spindle 101 of the front-side workpiece head 100, the chuck device 1 being configured to be drive-rotated as a result of drive rotation of the main spindle 101 by a rotary cylinder 102.

As shown in FIG. 3 to FIG. 10, the chuck device 1 of the front-side workpiece head 100 comprises a chuck main body 2 fixedly provided in a tip end of the main spindle 101, three guide grooves 2G being formed in a radiating shape with a center angle of 120° in a front face of the substantially cylindrically-shaped chuck main body 2 and chuck jaws 3 being engaged with each of the guide grooves 2G to move freely along the radial direction of the chuck main body 2.

In addition, a single guide groove 2H is formed in the front face of the chuck main body 2 extending in the chord direction therefrom, a phase jaw 4 being engaged with the guide groove 2H to move freely.

A center drive plunger 5 is provided to extend along the center axis of the interior of the chuck main body 2 penetratingly extending through the center axis of the main spindle 101, and a center 6 is affixed to the tip end of the center drive plunger 5.

The center drive plunger 5 moves along the axis line direction of the main spindle 101 and chuck main body 2 in accordance with the actuation of a center cylinder 103 (see FIG. 2) of the front-side workpiece head 100 causing the center 6 to advance and retreat between a retreat position and an operating position.

In addition, a chuck jaw drive sleeve (chuck jaw drive body) 7 inserted exterior of the center drive plunger 5 extending on the same axis as the center axis of the main spindle 101 and chuck main body 2 is arranged in the interior of the chuck main body 2.

Furthermore, a phase jaw drive sleeve (phase drive body) 8 inserted exterior of the chuck jaw drive sleeve 7 and extending on the same axis as the center axis of the main spindle 101 and chuck main body 2 is arranged in the interior of the chuck main body 2.

In the same way as the center drive plunger 5, the chuck jaw drive sleeve 7 and phase jaw drive sleeve 8 are configured to advance and retreat along the axis line direction of the main spindle 101 and chuck main body 2 in accordance with the actuation of respective hydraulic cylinders not shown in the drawings.

A pressing member 9 serving as a constituent element of a centering mechanism is pivotally supported in the chuck jaw drive sleeve 7 by way of a spherical bearing 10 to rotate freely and to be tiltable, or more particularly, to rotate freely about a center axis of the chuck jaw drive sleeve 7 and to be tiltable with respect to the plane orthogonal to the center axis of the chuck jaw drive sleeve 7.

The spherical bearing 10 is configured from a ring-shaped journal 10J of which part of the outer circumference is a spherical surface and an outer wreath 10R that mates with the outer circumference of the journal 10J, and is provided in a predetermined position on the chuck jaw drive sleeve 7 as a result of fixing of the journal 10J by means of a stepped part 7a of the chuck jaw drive sleeve 7 and a collar 7A.

The pressing member 9 comprises a front plate 9A and rear plate 9B in the center of which the chuck jaw drive sleeve 7 is inserted with play, and is configured by integrated assembly of the front plate 9A and rear plate 9B sandwiching the outer wreath 10R of the spherical bearing 10. That is to say, the pressing member 9 is pivotally supported in the chuck jaw drive sleeve 7 by way of the spherical bearing 10 provided in a center region.

Furthermore, a tongue piece 9t is formed in three locations projecting outward from the outer surface of the pressing member 9, and a pin 9P is embedded in each of the tongue pieces 9t. In addition, each of the tongue pieces 9t engage with concave grooves 11r formed in a base end part of chuck jaw rods 11.

The chuck jaw rods 11 are linkably provided with each of the three chuck jaws 3, 3 . . . and are housably provided behind each chuck jaw 3 extending in parallel to the center axis of the chuck main body 2 to advance and retreat freely along the center axis of the chuck main body 2.

Furthermore, a wedge-shaped inclined face 11c is formed in the tip end part of the chuck jaw rods 11, the inclined face 11c abutting an inclined face 3c formed in the rear part of the chuck jaws 3.

A tongue piece 8t is formed in a front end part of the phase jaw drive sleeve 8 projecting outward therefrom, the tongue piece 8t engaging with a concave groove 12r formed in a base end part of a phase jaw rod 12.

The phase jaw rod 12 is linkably provided with the phase jaw 4 and is housably provided behind the phase jaw 4 extending in parallel with the center axis of the chuck main body 2 to advance and retreat freely along the center axis of the chuck main body 2.

Furthermore, a wedge-shaped inclined face 12c is formed in a tip-end part of the phase jaw rod 12, the inclined face 12c abutting an inclined face 4c formed in the rear part of the phase jaw 4.

According to the method for machining a workpiece 1 of this configuration, clamping of a workpiece serving as the target for machining (crankshaft forged product) initially involves inserting of the end part of the workpiece (clamp part) inserted between the chuck jaws 3, 3 . . . of the method for machining a workpiece 1, moving of the center drive plunger 5 moved toward the workpiece and, subsequent to inserting of the center 6 in a center hole formed in the end face of the workpiece, centering of the workpiece (center axis positioning).

Next, due to a cam action between the inclined face 11c of the chuck jaw rod 11 and the inclined face 3c of the chuck jaw 3 produced by movement of the chuck jaw drive sleeve 7 toward the workpiece and squashing of the chuck jaw rods 11, 11 . . . by the pressing member 9, the chuck jaws 3, 3 . . . are moved in the center direction of the chuck main body 2 and the outer circumferential surface of the workpiece (clamp part) is clasped by the chuck jaws 3, 3 . . .

Following this, due to a cam action between the inclined face 12c of the phase jaw rod 12 and the inclined face 4c of the phase jaw 4 produced by movement of the phase jaw drive sleeve 8 toward the workpiece and squashing of the phase jaw rod 12 toward the workpiece, the phase jaw 4 is moved in the direction approaching the workpiece whereupon, with the phase jaw 4 abutting the machined positioning part of the workpiece (flat surface), the workpiece is positioned.

Figure 9:
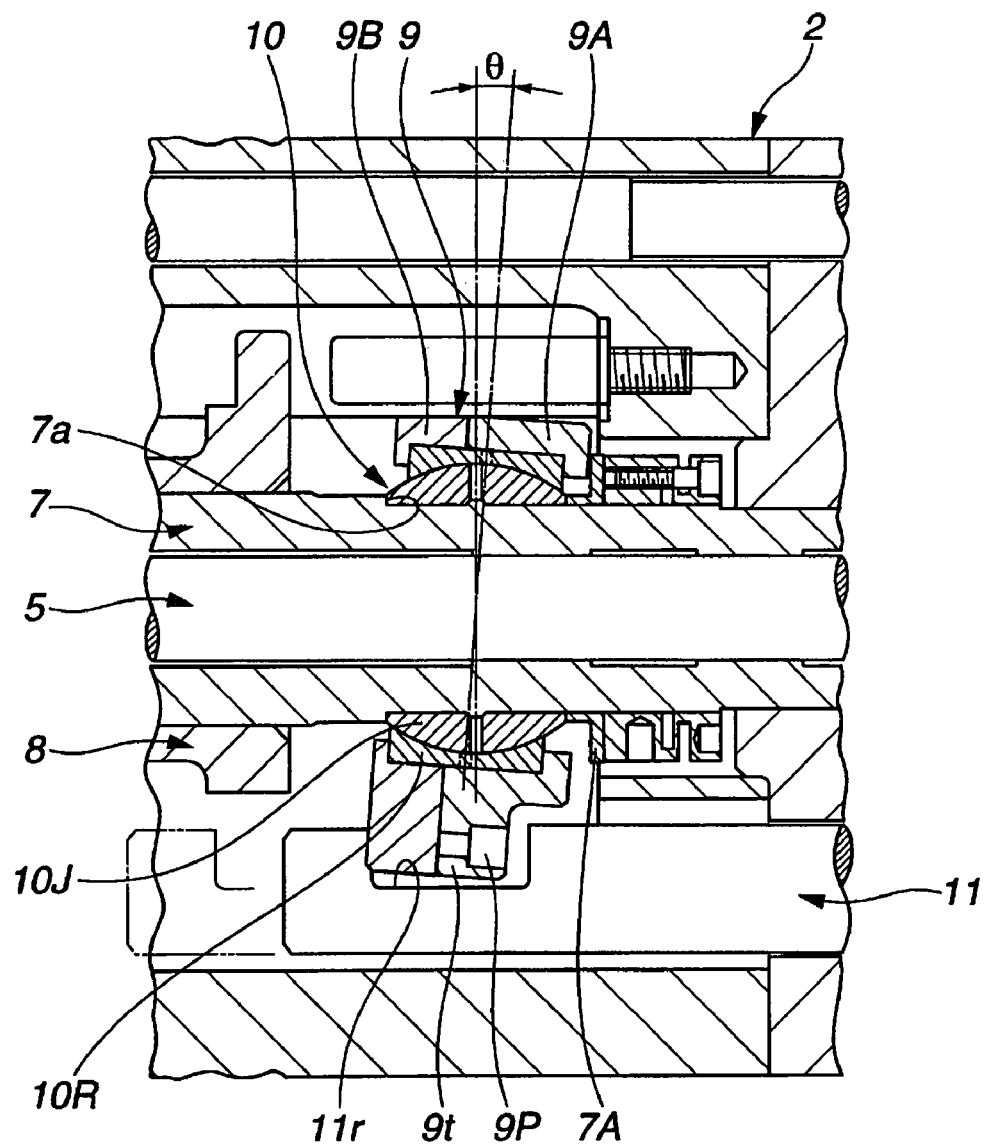
FIG. 9 is a main part cross-sectional side view showing the periphery of the pressing member of the chuck device shown in FIG. 3.

On the other hand, when deflection from the center axis occurs in the outer circumferential surface of the workpiece (dimensional error from a center reference) when, subsequent to centering of the workpiece by the center 6, the workpiece is clamped by the chuck jaws 3, 3 . . . , the workpiece is uniformly clamped by the chuck jaws 3, 3 . . . along the line of the outer circumferential surface as a result of a differential motion of the chuck jaws 3, 3 . . . produced by tilting of the pressing member 9 by an amount shown by the symbol θ of FIG. 9 that occurs when the chuck jaw drive sleeve 7 is moved toward the workpiece.

Following this, the workpiece is phase positioned by movement of the phase jaw drive sleeve 8 toward the workpiece to move the phase jaw 4 until it abuts the positioning part (flat surface).

The pivotal supporting of the pressing member 9 to be tiltable with respect to the chuck jaw drive sleeve 7 by way of the spherical bearing 10 arranged in the center region of the pressing member 9 in the method for machining a workpiece 1 of the configuration described above affords a greater pressing member 9 tilt angle with respect to the chuck jaw drive sleeve 7 than is possible with a conventional chuck device.

Figure 10:
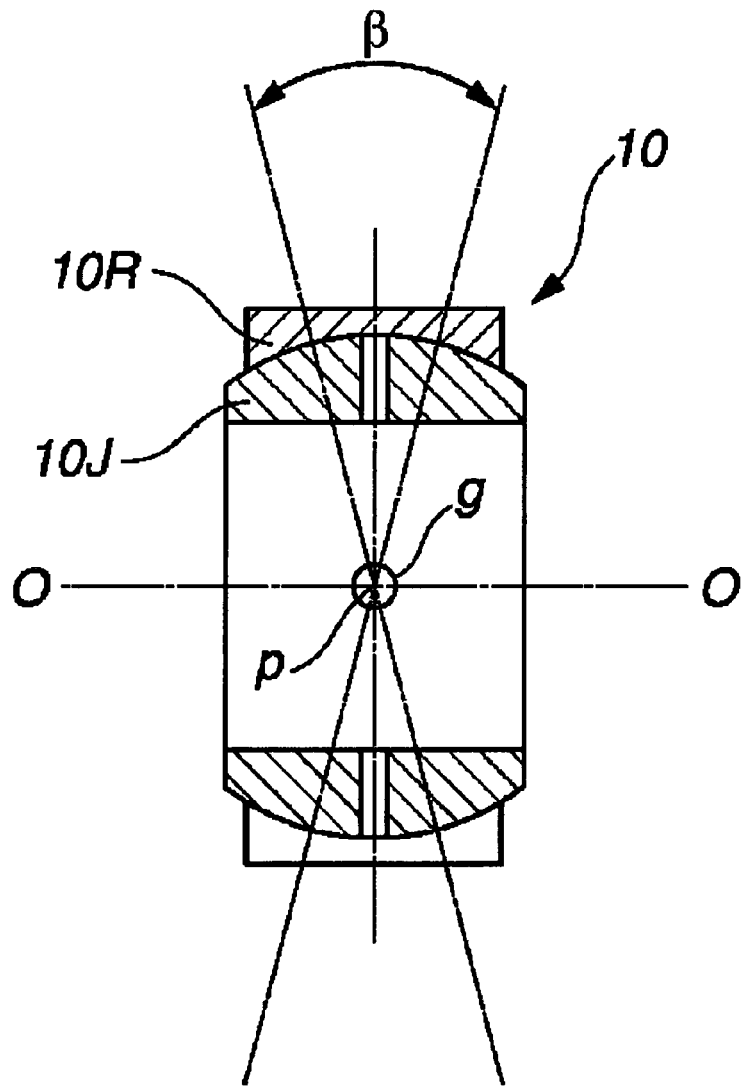
FIG. 10 is a conceptual cross-sectional view showing a spherical bearing of a centering mechanism of the chuck device shown in FIG. 3.

That is to say, the provision of the spherical bearing 10 in the center region of the pressing member 9 ensures a pivot position p and a gravitational center position g of the pressing member 9 as shown in FIG. 10 are approximately equivalent and ensures the essential elimination of undesirable effect of gravity is even when the pressing member 9 has been tilted a lot, the permissible tilt of the pressing member 9 extending across a broad angle range shown by the angle β.

As a result, the centering amount of the method for machining a workpiece 1 which is dependent upon the tilt of the pressing member 9, that is to say, the dimensional error from the center reference in the workpiece outer circumferential surface able be clasped by the plurality of chuck jaws 3, is markedly greater than that possible with a conventional method for machining a workpiece.

In the state attained by implementation of this centering in this way, even crankshaft starting materials in which there is discrepancy in the machining allowance (dimension of the section removed by cutting) of the outer circumference of the workpiece (clamp part) directly following forging because of the residual black skin surface can be reliably clamped.

Figure 11:
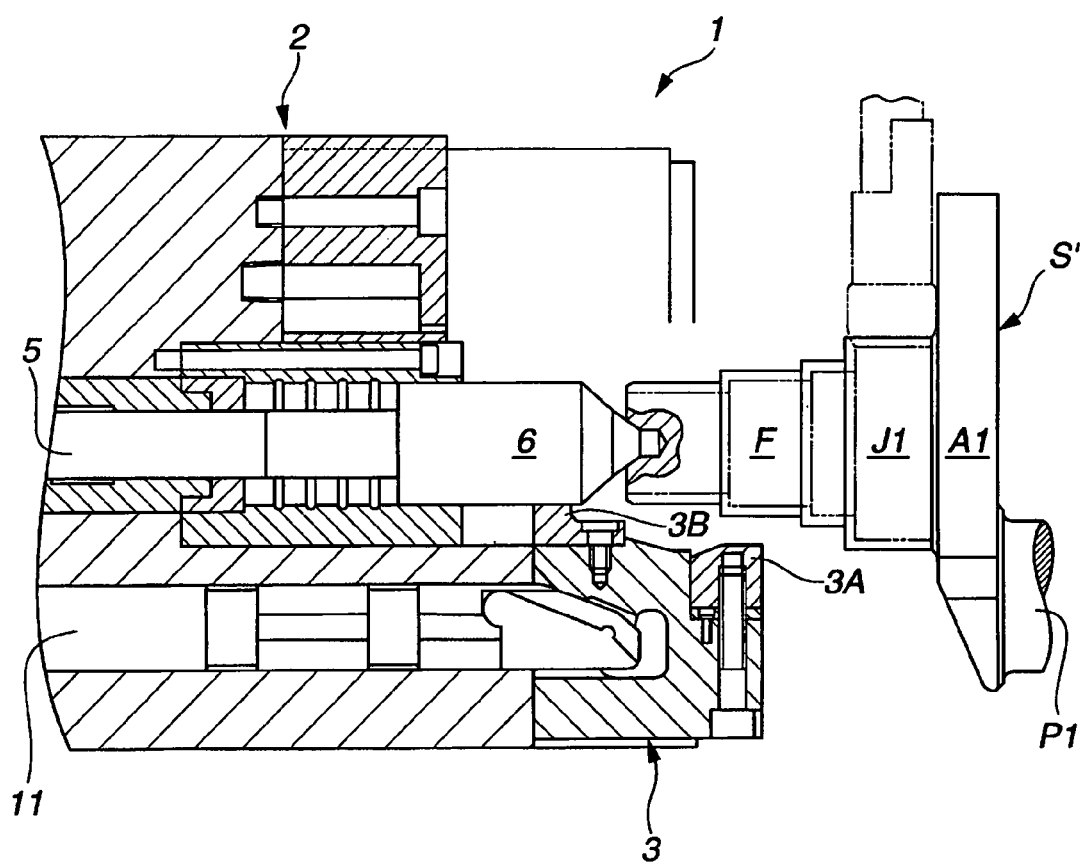
FIG. 11 is a main part cross-sectional side view of the chuck device.
Figure 12:
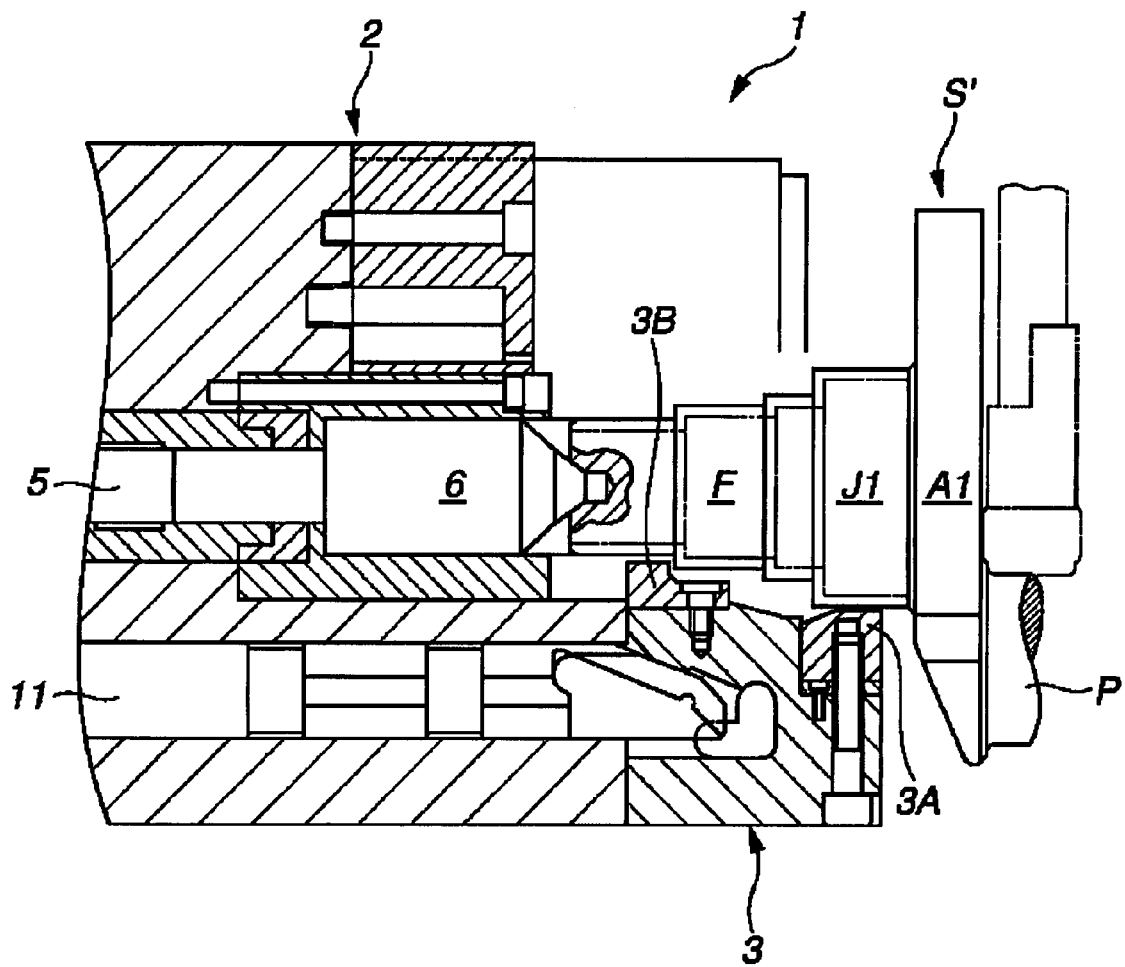
FIG. 12 is a main part cross-sectional side view of the chuck device.

In addition, as shown in FIG. 11 and FIG. 12, a first chuck part 3A and second chuck part 3B of different height (dimension of projection in the radial direction) are juxtaposedly arranged along the axial center direction in each of the chuck jaws 3 of the chuck device 1, a later-described regripping function of the workpiece being actualized by the relative advancing and retreating actuation of the center 6 in combination with the clamp parts 3A and 3B of the chuck jaws 3.

Here, as shown in FIG. 2, the first crankshaft mirror T2 comprises a front-side workpiece head 100 and rear-side workpiece head 100', the configuration of the rear-side workpiece head 100', with the exception of the fixed provision of the rear-side workpiece head 100' in the head 50, being fundamentally identical to the configuration of the front-side workpiece head 100.

In addition, the rear-side workpiece head 100' comprises a chuck device (second chuck device) 1' opposing the chuck device (first chuck device) 1 of the front-side workpiece head 100, the configuration of the chuck device 1' being identical to the chuck device 1 of the front-side workpiece head 100.

Accordingly, assigning of the symbol "'" (dash) to the elements of the rear-side workpiece head 100' having an identical action to the front-side workpiece head 100 affords omission of a detailed description pertaining to the rear-side workpiece head 100', and descriptions pertaining to the rear-side workpiece head 100' in the explanation that follows are given with reference to the configuration of the front-side workpiece head 100.

The machining sequence from the crankshaft starting material S' manufactured by forging to the semi-finish machining of the pins P1 to P4 of the crankshaft S in the production line L comprising a total of four machine tools consisting of a centering machine T1, a first crankshaft mirror T2, a turn-turn broaching machine T3 and a second crankshaft mirror T4 will be hereinafter described in detail.

First, the centering machine T1 performs a flat-surface machining of the front side end face and rear side end face of the crankshaft starting material S' and forms center holes in each of the front side end face and rear side end face. Incidentally, the machining step of the centering machine T1 is identical to the machining step of the conventional centering machine M1 (see FIG. 21).

Next, the crankshaft starting material S' is carried from the centering machine T1 by a workpiece loader not shown in the drawing and carried into the first crankshaft mirror T2.

As shown in FIG. 13A, in a state in which, subsequent to the center 6 of the chuck device 1 and the center 6' of the chuck device 1' being inserted in respective center holes, the crankshaft starting material S' is centered (center positioned), the journal J1 of the crankshaft starting material S' is clasped as a provisional clamp part by the first chuck part 3A of a chuck jaw 3 of the chuck device 1, and the rear flange R of the crankshaft starting material S' is clasped as a provisional clamp part by a first chuck part 3A' of a chuck jaw 3' of the chuck device 1', the first crankshaft mirror T2 performs a rough-finish machining of the outer circumferential surface of the journals J2 to J5, the outer circumferential surface of the pins P1 to P4, and the outer shape surface and inner surface of the arm A1, and performs a rough-finish machining of the external shape surface, outer surface and inner surface of the arms A2 to A8.

Following this, as shown in FIG. 13B, in a state in which, based a later-described workpiece regripping function, the center 6 is clasped by the second chuck part 3B of the chuck jaw 3 of the chuck device 1 to suppress "deflection" of the center 6 and, in addition, the first chuck part 3A of the chuck jaw 3 has been retreated to release the journal J1 of the crankshaft starting material S', the first crankshaft mirror T2 performs a milling machining of the outer circumferential surface of the journal J1 and the external shape surface of the arm A1.

Next, the crankshaft starting material S' is carried out from the first crankshaft mirror T2 by a workpiece loader not shown in the drawing and then carried into the turn-turn broaching machine T3.

As shown in FIG. 14A, in a state in which, subsequent to the center 6 of the chuck device 1 and the center 6' of the chuck device 1' being inserted in respective center holes, the crankshaft starting material S' is centered (center positioned), the front shaft F of the crankshaft starting material S' is clasped as a provisional clamp part by the first chuck part 3A of the chuck jaw 3 of the chuck device 1 and, in addition, the chuck jaw 3' of the chuck device 1' has been retreated, the center 6' is clasped by the second chuck part 3B', and the rear flange R of the crankshaft starting material S' is released, the turn-turn broaching machine T3 performs a grind machining of the outer circumferential surface of the front shaft F and the outer circumferential surface of the rear flange R.

Following this, as shown in FIG. 14B, in a state in which, based on a later described workpiece regripping function, the already machined rear flange R outer circumferential surface (clamp part) of the crankshaft starting material S' is clasped by the first chuck part 3A' of the chuck jaw 3' of the chuck device 1' and, in addition, the chuck jaw 3 of the chuck device 1 has been retreated so that the center 6 is clasped by the second chuck part 3B and the front shaft F of the crankshaft starting material S' is released, the turn-turn broaching machine T3 performs a grind machining of the outer circumferential surface of the front shaft F and the outer circumferential surface of the journal J1.

Figure 15:
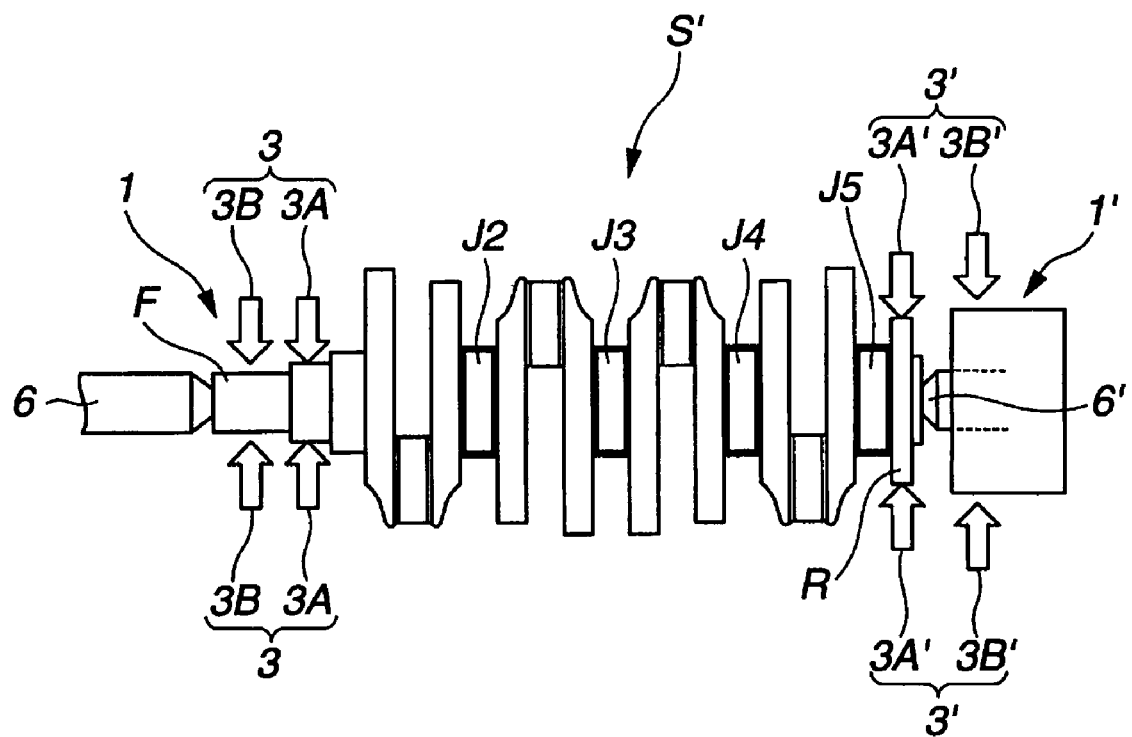
FIG. 15 is a conceptual view showing a crankshaft machined mode produced by the machine tool shown in FIG. 2.
Figure 16:
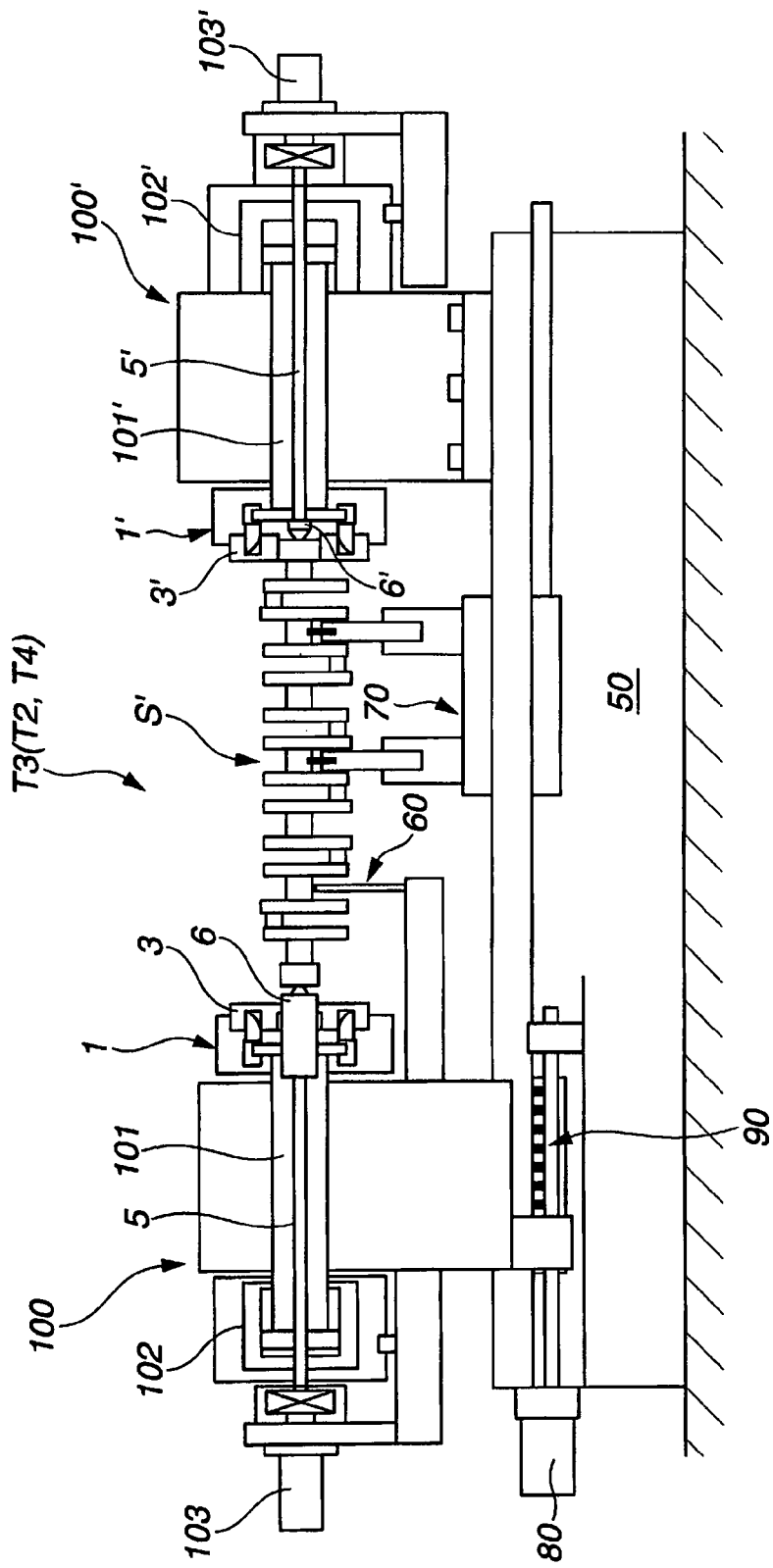
FIG. 16 is a conceptual view showing a workpiece regripping mode of the machine tool shown in FIG. 2.
Figure 17:
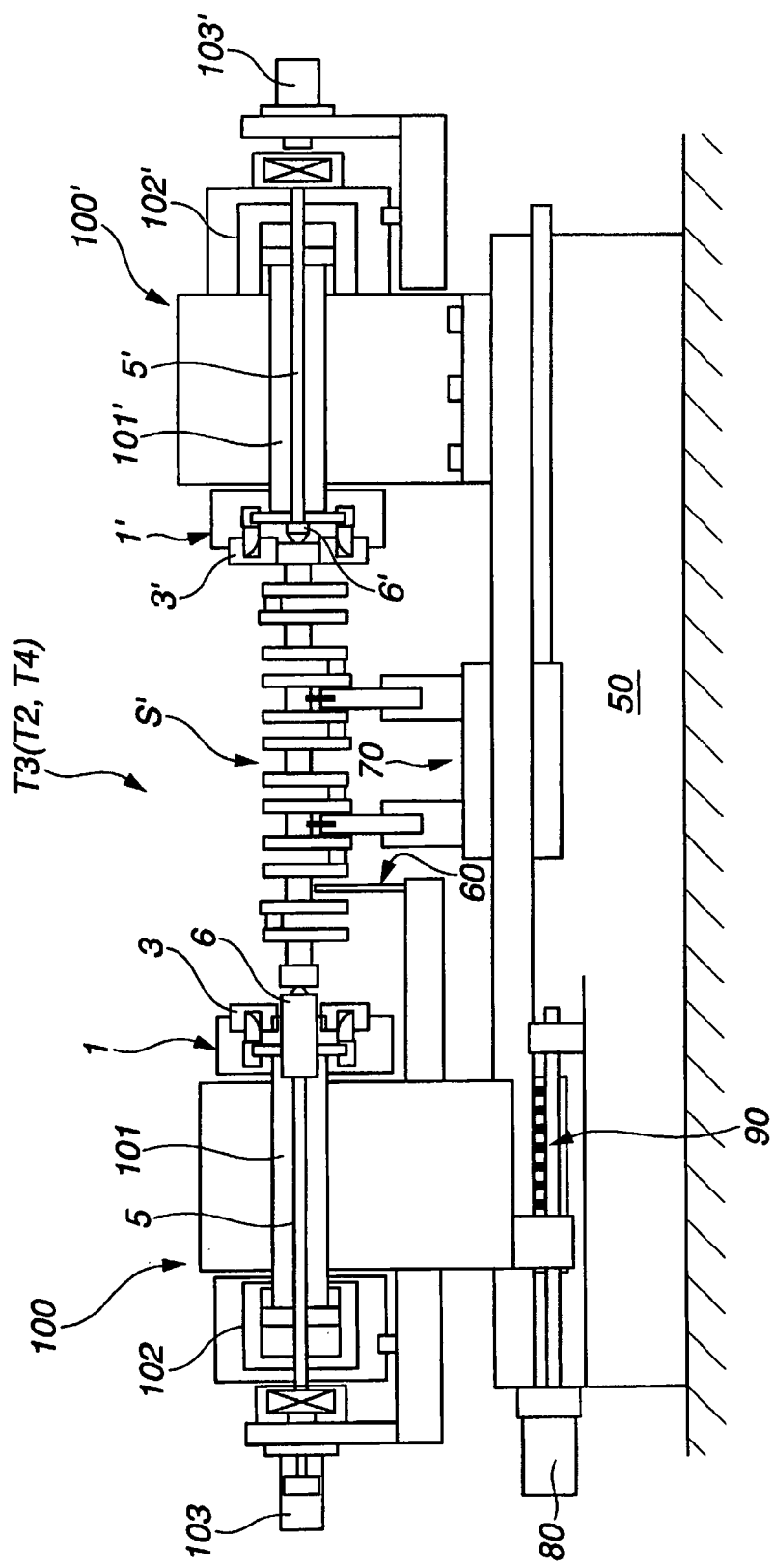
FIG. 17 is a conceptual view showing a workpiece regripping mode of the machine tool shown in FIG. 2.
Figure 18:
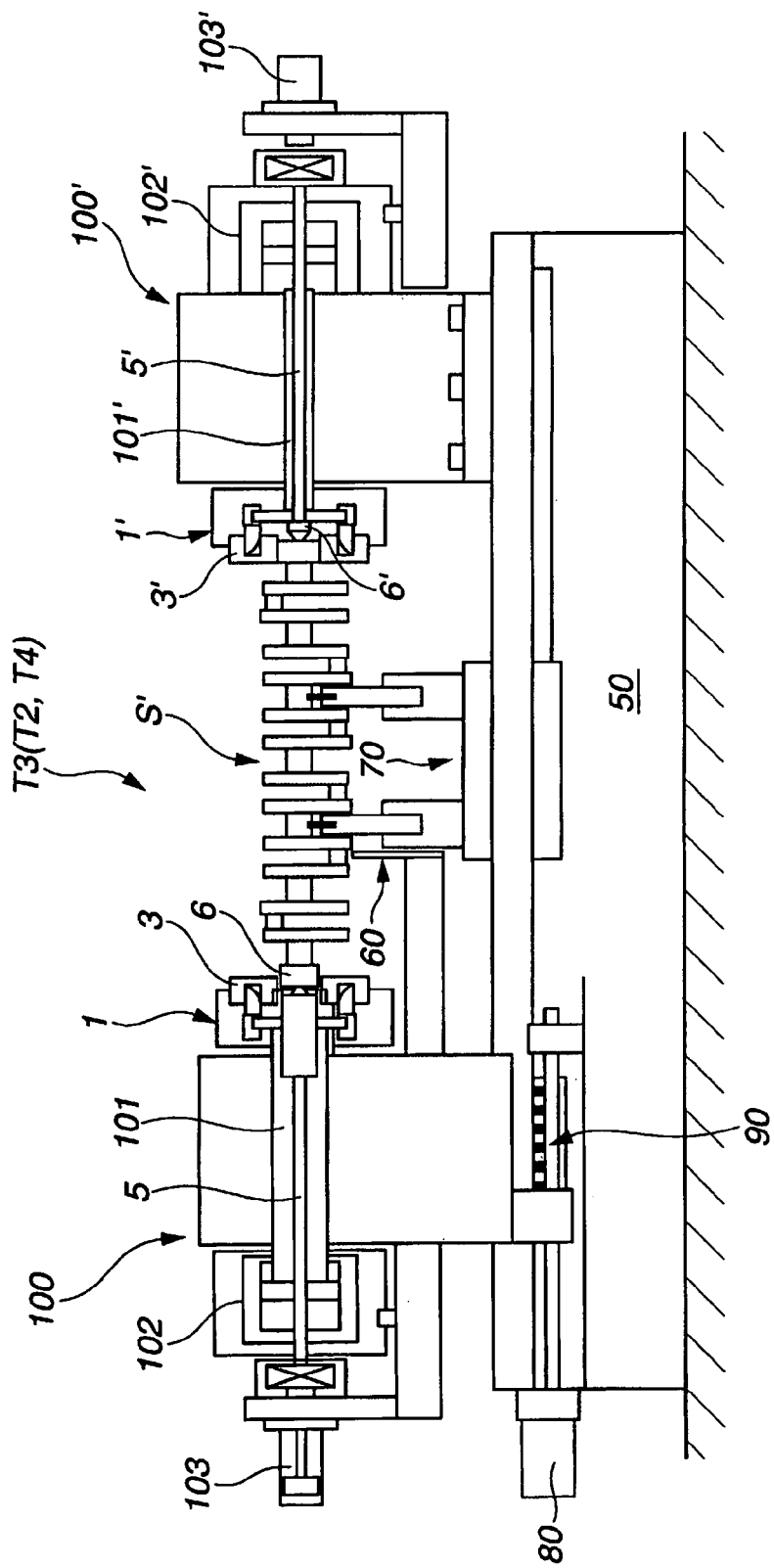
FIG. 18 is a conceptual view showing a workpiece regripping mode of the machine tool shown in FIG. 2.
Figure 19:
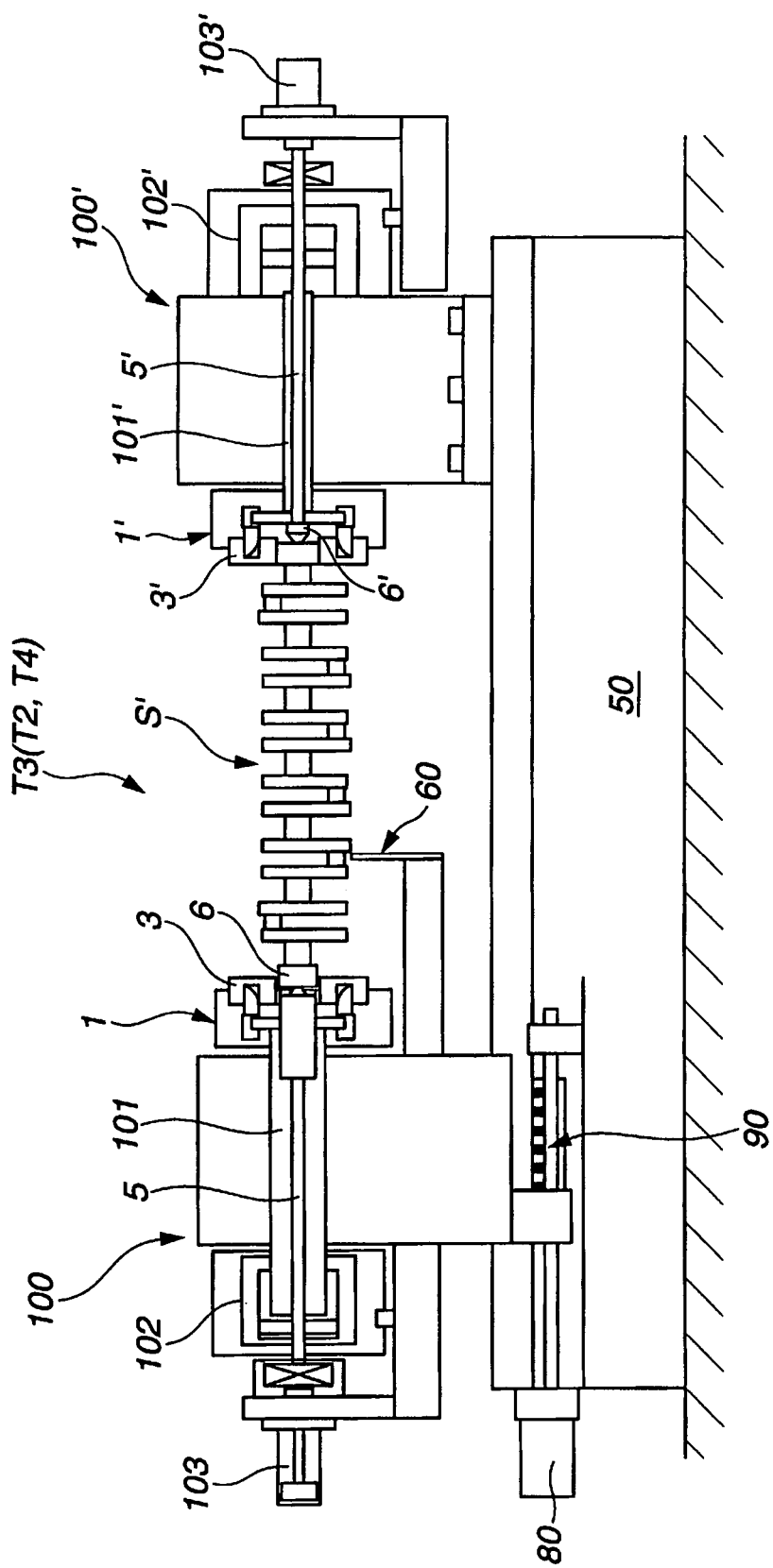
FIG. 19 is a conceptual view of a workpiece regripping mode of the machine tool shown in FIG. 2.

Furthermore, as shown in FIG. 15, in a state in which, based on the later-described workpiece regripping function, the outer circumferential surface (clamp part) of the already machined front shaft F of the crankshaft starting material S' is clasped by the first chuck part 3A of the chuck jaw 3 of the chuck device 1 and, in addition, the outer circumferential surface (clamp part) of the already machined rear flange R of the crankshaft starting material S' is clasped by the first chuck part 3A' of the chuck jaw 3' of the chuck device 1', the turn-turn broaching machine T3 performs a semi-finish machining of the outer circumferential surface of the journals J2 to J5 of the crankshaft starting material S'.

Next, the crankshaft starting material S' is carried out from the turn-turn broaching machine T3 and carried into the second crankshaft mirror T4 by a work loader not shown in the drawings, and the second crankshaft mirror T4 performs a semi-finish machining of the outer circumferential surface of the pins P1 to P4. Incidentally, the machining step performed by the second crankshaft mirror T4 is identical to the machining step of the conventional second crankshaft mirror M6 (see FIG. 21).

The workpiece regripping function will be hereinafter described using the machining step performed by the turn-turn broaching machine T3 as an example.

First, subsequent to the two ends of the crankshaft starting material S' having been carried to the workpiece buffer stage 60 of the turn-turn broaching machine T3 by a workpiece loader supported by the chuck device 1 and chuck device 1' respectively, a first workpiece regripping is performed.

That is to say, the chuck jaw 3' of the chuck device 1' is unclamped, workpiece head lock means 90 for locking the front-side workpiece head 100 is unlocked and, following lowering of the workpiece buffer stage 60, the front-side workpiece head 100 is retreated by the workpiece head movement servo motor 80 while the center 6' is being advanced by a center cylinder 103' of the rear-side workpiece head 100', and the front-side workpiece head 100 arriving at a predetermined position is locked by workpiece head lock means 90 whereupon, as shown in FIG. 14A, in a state in which the center 6' is clamped by the chuck jaw 3' of the chuck device 1', the rear flange R of the crankshaft starting material S' is machined as a result of the drive rotation of the main spindle 101 of the front-side workpiece head 100.

A second workpiece regripping is performed subsequent to completion of the machining of the rear flange R of the crankshaft starting material S'.

That is to say, the main spindle 101 of the front-side workpiece head 100 is stopped, the chuck jaw 3' of the chuck device 1' is unclamped, workpiece head lock means 90 for locking the front-side workpiece head 100 is unlocked, and the front-side workpiece head 100 is advanced by the workpiece head movement servo motor 80 causing the rear-side workpiece head 100' to retreat by way of the crankshaft starting material S' whereupon, subsequent to the rear-side workpiece head 100' arriving at a predetermined position, the rear flange R of the crankshaft starting material S' is clamped by the chuck jaw 3' of the chuck device 1'.

Next, the chuck jaw 3 of the chuck device 1 is unclamped, the front-side workpiece head 100 is retreated by the workpiece head movement servo motor 80, and the front-side workpiece head 100 arriving at the predetermined position is locked by workpiece head lock means 90 whereupon, as shown in FIG. 14B, in a state in which the center 6 is clamped by the chuck jaw 3 of the chuck device 1, the front shaft F and journal J1 of the crankshaft starting material S' are machined as a result of the drive rotation of the main spindle 101' of the rear-side workpiece head 100'.

A third workpiece regripping is performed subsequent to completion of the machining of the front shaft F and journal J1 of the crankshaft starting material S'.

That is to say, the main spindle 101' of the rear-side workpiece head 100' is stopped, the chuck jaw 3 of the chuck device 1 is unclamped (see FIG. 16 and FIG. 17), workpiece head lock means 90 for locking the front-side workpiece head 100 is unlocked, and the front-side workpiece head 100 is advanced by the workpiece head movement servo motor 80 (see FIG. 18) and the front-side workpiece head 100 arriving at the predetermined position is locked by workpiece head lock means 90 whereupon, as shown in FIG. 15, in a state in which the front shaft F of the crankshaft starting material S' is clamped by the chuck jaw 3 of the chuck device 1 (see FIG. 19) and the rear flange R of the crankshaft starting material S' is clamped by the chuck jaw 3' of the chuck device 1', the journals J2 to J5 of the crankshaft starting material S' are machined as a result of the drive rotation of the main spindle 101 (or main spindle 101').

Incidentally, subsequent to completion of the machining of the journal J2 to J5 of the crankshaft starting material S', the rotation of the main spindle 101 (or main spindle 101') is stopped, and an orientation of the main spindle 101 and main spindle 101' (operation for restoring the posture of the chuck device 1 and chuck device 1' in the rotating direction to the original position) is performed whereupon, in a state in which the workpiece buffer stage 60 has been lifted to support the crankshaft starting material S', the chuck jaw 3 of the chuck device 1 and the chuck jaw 3' of the chuck device 1' are unclamped and the center 6 of the chuck device 1 and the center 6' of the chuck device 1' are retreated and removed from the crankshaft starting material S', after which the crankshaft starting material S' is carried out from the turn-turn broaching machine T3 by a workpiece loader and carried into the second crankshaft mirror T4.

In the production line L in which the method for machining a workpiece pertaining to the present invention has application as described above, because the chuck device (first chuck device) 1 and chuck device (second chuck device) 1' of the turn-turn broaching machine T3 (machine tool) comprise a pressing member pivotally supported in a chuck jaw drive body by way of a spherical bearing, a far greater centering amount, that is to say, dimensional error from a center reference in the workpiece outer circumferential surface than possible with an existing chuck device can be clasped by a plurality of chuck jaws, and the black coating surface of a workpiece manufactured by forging can be clasped.

For this reason, the machining of the clamp part for which there has hitherto been a reliance upon separate machine tools (lathes) is possible using the turn-turn broaching machine T3 and, using a single turn-turn broaching machine T3 (machine tool), a machining of clamp parts of a one end part and the other end part of the crankshaft starting material S', along with a predetermined machining of the crankshaft starting material S' can be carried out.

Accordingly, based on the method for machining a workpiece pertaining to the present invention in which the turn-turn broaching machine T3 is employed, the need for a front-side lathe and a rear-side lathe for machining the clamp parts of the crankshaft starting material S' as employed in a conventional production line is eliminated, and the number of machine tools provided in the crankshaft production line L of this embodiment can be reduced significantly from six to four.

By reducing the number of machining tools of the crankshaft production line L in this way, the equipment costs of the six machine tools and the equipment costs of the loaders provided between the machine tools and, furthermore, the land costs as well as increased fundamental construction costs associated with securing the factory building area can be suppressed and, in turn, the electrical power energy costs for operating the production line and, in addition, the costs for processing of the scraps and so on discharged from each of the machining tools and the upkeep costs associated with maintenance and inspection of each machine tool can be suppressed.

While the embodiment described above cites an example in which the method for machining a workpiece pertaining to the present invention has application in a crankshaft production line, the present invention is not restricted to machining of a crankshaft alone and has effective application in any method for machining a workpiece, including circular rods, in which the workpiece requires machining in a state in which two end clamp parts are clasped by a machine tool comprising a first chuck device and second chuck device.

What is claimed is:

1. A method for machining a workpiece in which a plurality of machine tools each comprising a first chuck device for clamping one end part of the workpiece and a second chuck device for clamping the other end part of the workpiece are employed to carry out a machining operation on the workpiece, the machine tools being used in which the first chuck device and the second chuck device each comprise a chuck main body fixedly arranged in a tip end of a main spindle, a plurality of chuck jaws arranged to move freely along a radial direction of the chuck main body, a chuck jaw drive body, provided concentrically with a center axis of the main spindle and the chuck main body, that moves advancingly and retreatively along the center axis, and a pressing member supported rotatably and tiltably by the chuck jaw drive body through a spherical bearing disposed about the center axis and which is configured to clamp the workpiece by pressing a plurality of chuck jaw rods respectively linked with the plurality of chuck jaws using the pressing member in accordance with actuation of the chuck jaw drive body and by causing the plurality of chuck jaws to move in a radially inward direction, the workpiece being a crankshaft starting material for manufacturing a crankshaft having a predetermined number of journals and pins, a front shaft arranged at an end part of the workpiece on the first chuck device side, and a rear flange arranged at other end part of the workpiece on the second chuck device side, the method comprising the steps of:

1) in one of the machine tools, inserting centers of the first chuck device and the second chuck device into center holes of the workpiece, 2) performing rough-finish machining of outer circumferential surfaces of journals except for a first journal which is the closest to the first chuck device side, while clamping a starting material surface of the first journal of the workpiece by the first chuck device and clamping the starting material surface of the rear flange by the second chuck device, 3) performing milling machining of an outer circumferential surface of the first journal, while clamping the center of the first chuck device by a portion of the first chuck device, and clamping the starting material of the rear flange by the second chuck device, 4) in another of the machine tools, inserting the centers of the first and second chuck device into the center holes of the workpiece and performing grind machining of the outer circumferential surface of the rear flange, while clamping the staffing material of the front shaft by the first chuck device, and clampin the center of the second chuck device by a portion of the second chuck device, 5) performing grind machining of the outer circumferential surfaces of the front shaft and the first journal, while clamping the center of the first chuck device by a portion of the first chuck device, and clamping the grind-machined rear flange by the second chuck device, 6) performing semi-finish machining of the outer circumferential surface of the journals except for the first journal, while clamping the grind machined front shaft by the first chuck device, and clamping the grind machined rear flange by the second chuck device, and 7) in a further one of the machine tools, inserting the centers of the first and second chuck device into the center holes of the workpiece and performing semi-finish machining of an outer circumferential surface of the pins, while clamping the grind machined front shaft or the grind machined first journal by the first chuck device, and clamping the semi-finish machined rear flange by the second chuck device.

* * * * *